United States Patent
Katayama et al.

(10) Patent No.: US 8,632,256 B2
(45) Date of Patent: Jan. 21, 2014

(54) ROCKING BEARING OUTER RING, ROCKING BEARING, AIR DISC BRAKE DEVICE, AND FITTING STRUCTURE OF ROCKING BEARING OUTER RING

(75) Inventors: Akihiko Katayama, Iwata (JP); Masaru Kuroda, Iwata (JP); Haruki Yamada, Iwata (JP)

(73) Assignee: NTN Corporation, Osaka (JP)

( * ) Notice: Subject to any disclaimer, the term of this patent is extended or adjusted under 35 U.S.C. 154(b) by 595 days.

(21) Appl. No.: 12/666,655

(22) PCT Filed: May 21, 2008

(86) PCT No.: PCT/JP2008/059316
§ 371 (c)(1),
(2), (4) Date: Dec. 24, 2009

(87) PCT Pub. No.: WO2009/001636
PCT Pub. Date: Dec. 31, 2008

(65) Prior Publication Data
US 2010/0187051 A1    Jul. 29, 2010

(30) Foreign Application Priority Data

| Jun. 28, 2007 | (JP) | 2007-170510 |
| Jun. 29, 2007 | (JP) | 2007-171994 |
| Jul. 4, 2007 | (JP) | 2007-176143 |
| Jul. 11, 2007 | (JP) | 2007-181949 |
| Jul. 17, 2007 | (JP) | 2007-185407 |

(51) Int. Cl.
*F16C 33/58* (2006.01)
*F16C 43/04* (2006.01)
*F16C 33/48* (2006.01)

(52) U.S. Cl.
USPC ............... 384/564; 384/572; 384/560

(58) Field of Classification Search
USPC ............ 384/2, 429, 440, 457, 560, 565, 569, 384/571–580, 564
See application file for complete search history.

(56) References Cited

U.S. PATENT DOCUMENTS

| 979,317 | A | * | 12/1910 | Lookwood | 384/569 |
| 3,710,471 | A | * | 1/1973 | Pitner | 29/898.066 |
| 5,641,038 | A | * | 6/1997 | Akamatsu | 184/6.17 |
| 5,819,884 | A | | 10/1998 | Giering | |
| 6,062,736 | A | * | 5/2000 | Zernickel | 384/581 |
| 7,896,557 | B2 | * | 3/2011 | Nakano et al. | 384/570 |
| 2001/0033703 | A1 | * | 10/2001 | Martin | 384/296 |
| 2002/0037123 | A1 | * | 3/2002 | Kobayashi | 384/513 |
| 2003/0165281 | A1 | * | 9/2003 | Fujioka et al. | 384/618 |
| 2006/0086575 | A1 | * | 4/2006 | Niehorster | 188/71.9 |
| 2006/0182379 | A1 | * | 8/2006 | Grell et al. | 384/569 |
| 2007/0053621 | A1 | * | 3/2007 | Kazama | 384/445 |
| 2009/0123105 | A1 | * | 5/2009 | Masuda et al. | 384/618 |

FOREIGN PATENT DOCUMENTS

| CN | 1977117 | 6/2007 |
| DE | 10 2005 034739 | 2/2007 |
| JP | 54-57243 U | 4/1979 |
| JP | 2002-98156 A | 4/2002 |

(Continued)

*Primary Examiner* — Alan B Waits
(74) *Attorney, Agent, or Firm* — Clark & Brody

(57) ABSTRACT

A rocking bearing outer ring (12) includes an arcuate track member (13) having a track surface on its inner diameter surface, and a flange portion (14) projecting radially inward from each widthwise end portion of the track member (13). In addition, when it is assumed that $L_1$ represents a circumferential length of the track member (13) and $L_2$ represents a circumferential length of the flange portion (14), $0.2 \leq L_2/L_1 \leq 8$ is satisfied.

14 Claims, 16 Drawing Sheets

(56) References Cited

FOREIGN PATENT DOCUMENTS

| | | |
|---|---|---|
| JP | 2003-206933 A | 7/2003 |
| JP | 2006-022826 | 1/2006 |
| JP | 2006-145040 A | 6/2006 |
| JP | 2007-032671 | 2/2007 |
| JP | 2007-64310 A | 3/2007 |
| WO | 2005/119073 | 12/2005 |
| WO | 2006/002905 A1 | 1/2006 |
| WO | WO 2006098276 A1 * | 9/2006 ............ F16C 19/46 |

* cited by examiner

PRIOR ART

ROCKING BEARING OUTER RING, ROCKING BEARING, AIR DISC BRAKE DEVICE, AND FITTING STRUCTURE OF ROCKING BEARING OUTER RING

TECHNICAL FIELD

The present invention relates to a rocking bearing outer ring, a rocking bearing, and an air disc brake device.

BACKGROUND ART

A conventional rocking bearing is disclosed in WO2006/002905A1, for example. The rocking bearing disclosed in the above document includes an arcuate rocking bearing outer ring having a track surface on its inner diameter surface, a plurality of rollers disposed along the track surface, and a retainer for retaining the plurality of rollers. In addition, throughout a circumferential region of the rocking bearing outer ring, a flange portion is formed so as to project radially inward from each widthwise end portion thereof, in order to regulate the widthwise movements of the rollers and the retainer.

The above rocking bearing is used in an air disc brake device of a large-sized commercial car, a track, or a bus. In addition, the rocking bearing used in the air disc brake device is lubricated with grease in general.

Here, a description will be made of a case where a rocking bearing outer ring is built in a housing, with reference to FIGS. 26 and 27. First, referring to FIG. 26, when the curvature radius of a rocking bearing outer ring 101 is smaller than that of a housing 102, a gap is formed between the rocking bearing outer ring 101 and the housing 102. This gap causes the rocking bearing to wobble at the time of rocking.

Meanwhile, referring to FIG. 27, when the curvature radius of a rocking bearing outer ring 103 is larger than that of a housing 104, the rocking bearing outer ring 103 has to be built in while force (referred to as the pre-compression hereinafter) is applied to reduce its curvature radius.

However, when the difference in curvature radius between the rocking bearing outer ring 103 and the housing 104 is increased, high pre-compression has to be applied to build in the rocking bearing outer ring 103 by the above method. Meanwhile, as the pre-compression becomes high, rotation torque is increased at the time of rocking, which causes the rocking bearing to generate abnormal heat, and as a result, the rocking bearing to decrease its life span.

In addition, the above-described rocking bearing outer ring regulates the widthwise movements of the rollers and the retainer. However, the rocking bearing outer ring in this case cannot regulate the widthwise movements of the rollers and the retainer, so that the rollers and the retainer could separate in the radial direction of the rocking bearing outer ring and shift their positions at the time of shipping and assembling. This causes the number of assembling steps to increase and defective products to outflow.

Furthermore, since both circumferential end portions of the rocking bearing are open, grease is pushed outside at the time of rocking, which causes the grease to run out in the bearing. As a result, abnormal heat and abnormal wear are generated, which reduces the life span of the rocking bearing.

DISCLOSURE OF INVENTION

Thus, it is an object of the present invention to provide a rocking bearing outer ring which can be closely in contact with a housing by suitable pre-compression. In addition, it is an object to provide long-lived and highly-reliable rocking bearing and air disc brake device by employing such rocking bearing outer ring.

It is another object of the present invention to provide a rocking bearing outer ring which can regulate widthwise and radial movements of the rollers and retainer. In addition, it is another object to provide a rocking bearing which can prevent the rollers and the retainer from separating in the widthwise and radial directions of the rocking bearing outer ring by employing such rocking bearing outer ring. Furthermore, it is another object to provide a highly-productive air disc brake device by employing such rocking bearing.

It is still another object of the present invention to provide a rocking bearing which is high in lubrication performance. In addition, it is still another object to provide a long-lived and highly-reliable air disc brake device by employing such rocking bearing.

A rocking bearing outer ring according to the present invention includes an arcuate track member having a track surface on an inner diameter surface, and a flange portion projecting radially inward from each widthwise end portion of the track member. Thus, $0.2 \leq L_2/L_1 \leq 0.8$ is satisfied wherein $L_1$ represents a circumferential length of the track member and $L_2$ represents a circumferential length of the flange portion.

Here, when the value of $L_2/L_1$ is 0.8 or less, the rigidity of the rocking bearing outer ring can be sufficiently lowered. Meanwhile, when the value of $L_2/L_1$ is less than 0.2, the widthwise movement of the retainer cannot be appropriately regulated. As a result, the retainer largely leans in the circumferential direction of the rocking bearing, and the behavior of the retainer and the roller becomes unstable. Thus, when the circumferential length of the flange portion is limited within the above range, the rocking bearing outer ring can be closely in contact with the housing by the suitable pre-compression, and the widthwise movement of the retainer can be appropriately regulated.

Preferably, the flange portion is positioned at a circumferential center region of the track member. Thus, the retainer can be inserted from the circumferential end portion of the track member along the track surface. As a result, the assembly property of the rocking bearing can be improved.

Preferably, the flange portion includes a first flange portion, and a second flange portion having a relatively small projection length and disposed so as to be circumferentially adjacent to the first flange portion. Thus, when the circumferential part of the flange portion is partially reduced in projection length, the rigidity of the rocking bearing outer ring is lowered. As a result, the rocking bearing outer ring can be closely in contact with the housing by the suitable pre-compression. In addition, the "flange portion" in this specification includes a case where the projection length of the second flange portion is 0 mm, that is, a case where the second flange portion is not formed at the position circumferentially adjacent to the first flange portion.

A rocking bearing according to the present invention includes the above-described rocking bearing outer ring, a plurality of rollers disposed along the track surface, and a retainer retaining the plurality of rollers. Thus, the long-lived and highly-reliable rocking bearing can be provided.

Preferably, the flange portion further includes a projection portion extending widthwise inward from its tip end to retain the retainer from the radially inner side. Thus, the retainer can be effectively prevented from dropping out in the radial direction of the rocking bearing outer ring.

Preferably, the flange portion extends radially inward from each widthwise end portion of the track member so as to form an acute angle with the track surface. The retainer is disposed in a region surrounded by the track surface and the flange portion. A distance between tip ends of the pair of flange portions is shorter than a maximum width dimension of the retainer. Thus, the roller and the retainer can be prevented from dropping out in the widthwise and radial directions of the rocking bearing outer ring.

Preferably, the flange portion is formed by a bending process. Thus, the flange portion can be easily formed.

Preferably, the retainer has a continuing projection strip on its widthwise end surface. When the projection strip and the flange portion are engaged with each other, the retainer can be effectively prevented from dropping out in the radial direction of the rocking bearing outer ring.

Preferably, the retainer is a resin retainer containing polyamide 46 and 5% to 20% by weight of fibrous filler material. When the resin retainer contains polyamide 46 as its mother material, it is necessary to add 5% or more by weight of fibrous filler material in order to obtain mechanical properties required in the retainer. Meanwhile, when the content of the fibrous filler material exceeds 20% by weight, the retainer is reduced in toughness and becomes fragile. In addition, the viscosity is high at the time of molding, and it is difficult to form the retainer with a mold and the like. In addition, as the fibrous filler material, carbon fiber or glass fiber may be employed.

Preferably, $1 < r_1/r_2 < 1.15$ is satisfied wherein $r_1$ represents a curvature radius of an outer diameter of the rocking bearing outer ring, and $r_2$ represents a curvature radius of an outer diameter of the retainer. When the curvature radiuses $r_1$ and $r_2$ of the rocking bearing outer ring and the retainer, respectively are set within the above range, the rocking bearing outer ring can be closely in contact with the housing by suitable pre-compression.

Preferably, each of the plurality of rollers has numerous fine dents formed in its surface at random. In addition, it is preferable that an area ratio of the dents to a surface area of the roller is 10% to 40%.

Thus, an oil formation property can be improved in the roller. As a result, the long-lived rocking bearing can be provided even under the condition of low viscosity and thin lubrication. In addition, when the area ratio of the dents is less than 10%, an oil forming ability is low and the oil film cannot have a sufficient thickness. Meanwhile, when the area ratio of the dents exceeds 40%, the contact area between the roller and the rocking bearing outer ring is reduced and lubrication performance deteriorates.

Still preferably, a Sk value of the roller surface is −1.6 or less. When the Sk value is set within the above range, the oil forming property is improved and the long-lived rocking bearing can be provided.

In addition, the "Sk value" in this specification means the skewness of a roughness curve (ISO4287:1997), and means statistics to get a rough idea of the asymmetry property of concavo-convex distribution, and when the distribution is symmetric like Gaussian distribution, the Sk value is close to zero, and when the convex part is eliminated, the value shows a negative value, and when the concave part is eliminated, the value shows a positive value. In addition, the Sk value is controlled by selecting the rotation speed of a barrel finishing machine, a process time, a labor input, the kind and size of a chip and the like.

An air disc brake device according to the present invention includes any one of the above-described rocking bearings. Thus, the long-lived and highly-reliable air disc brake device can be provided.

A fitting structure of a rocking bearing outer ring according to the present invention includes a rocking bearing outer ring having an arcuate track member having a track surface on an inner diameter surface, and a flange portion projecting radially inward from each widthwise end portion of the track member, and a housing for holding the rocking bearing outer ring. Thus, $1 < r_1/r_3 < 1.15$ is satisfied wherein $r_1$ represents a curvature radius of an outer diameter of the rocking bearing outer ring, and $r_3$ represents a curvature radius of an inner diameter of the housing. When the curvature radiuses $r_1$ and $r_3$ of the rocking bearing outer ring and the housing, respectively are set within the above range, the rocking bearing outer ring can be closely in contact with the housing by suitable pre-compression.

BEST MODE FOR CARRYING OUT THE INVENTION

Figure 3:
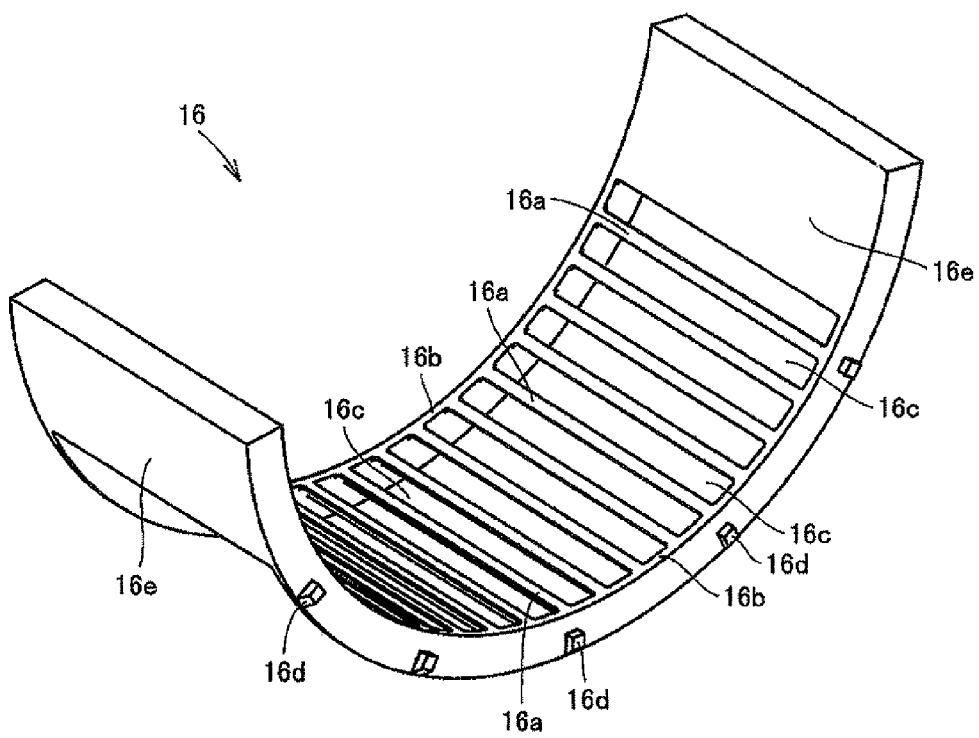
FIG. 3 is a perspective view of a retainer shown in FIG. 1.
Figure 4:
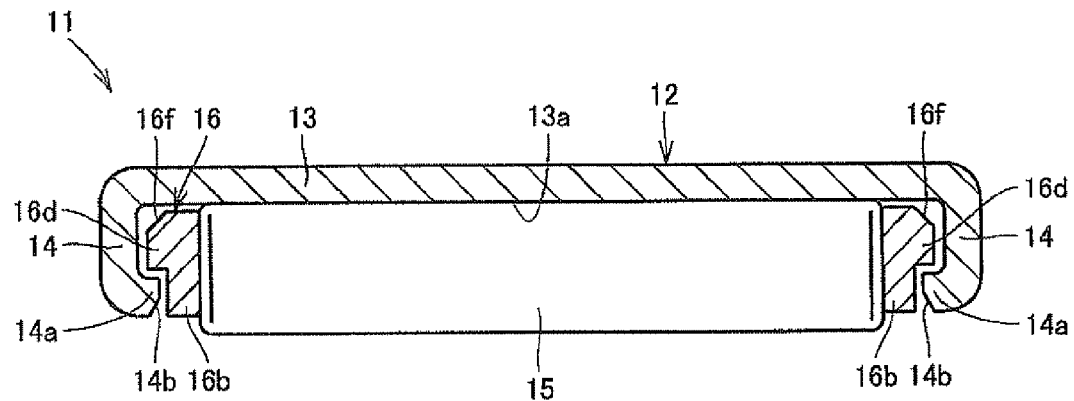
FIG. 4 is a cross-sectional view taken along a line IV-IV in FIG. 1.

A rocking bearing 11 according to one embodiment of the present invention will be described with reference to FIGS. 1 to 4. In addition, FIG. 1 is a perspective view of the rocking bearing 11, FIG. 2 is a perspective view of a rocking bearing outer ring 12, FIG. 3 is a perspective view of a retainer 16, and FIG. 4 is a cross-sectional view taken along a line IV-IV in FIG. 1.

Figure 1:
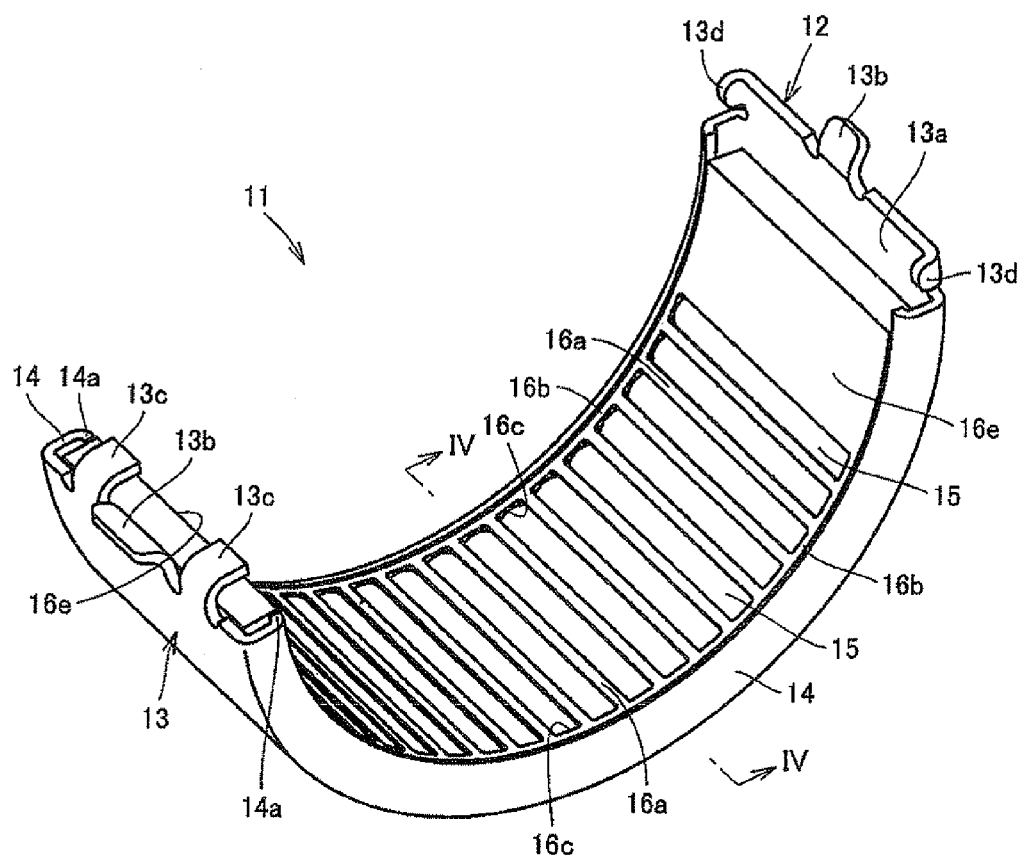
FIG. 1 is a perspective view of a rocking bearing according to one embodiment of the present invention.

First, referring to FIG. 1, the rocking bearing 11 includes the rocking bearing outer ring 12, a plurality of rollers 15 arranged along an inner diameter surface of the rocking bearing outer ring 12, and the retainer 16 retaining the plurality of rollers 15.

Figure 2:
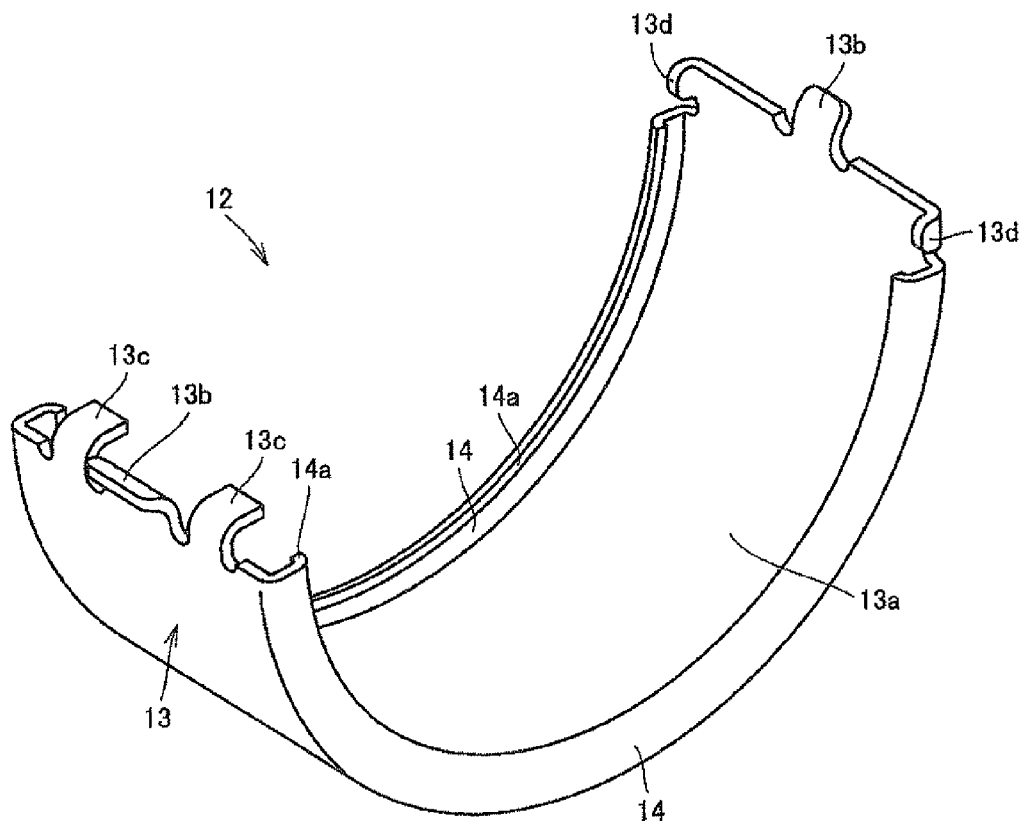
FIG. 2 is a perspective view of a rocking bearing outer ring shown in FIG. 1.

Next, referring to FIG. 2, the rocking bearing outer ring 12 includes a track member 13 of an arcuate shape (semicircular shape having a center angle of 180° in this embodiment) having a track surface 13a on its inner diameter surface, and a flange portion 14 projecting radially inward from each widthwise end portion of the track member 13 to regulate the widthwise movements of the rollers 15 and the retainer 16. In addition, the flange portion 14 is formed throughout the circumferential region of the track member 13 in this embodiment.

The track member 13 has an outward projection piece 13b provided at each circumferential end portion, an inward projection piece 13c provided at one circumferential end portion (left side in FIG. 1), and a click portion 13d provided at the other circumferential end portion (right side in FIG. 1). The flange portion 14 has a projection portion 14a extending widthwise inward of the track member 13 from its tip end.

The outward projection piece 13b extends radially outward from a widthwise center portion of each circumferential end portion of the track member 13. This outward projection piece 13b engages with a housing (not shown) to prevent the rocking bearing outer ring 12 from circumferentially moving, that is, to prevent the rocking bearing outer ring 12 from rotating in the housing.

The two inward projection pieces 13c extend radially inward from both widthwise sides of the outward projection piece 13b. This inward projection piece 13c abuts on the circumferential end surface of the retainer 16 to prevent the retainer 16 from sliding out of one circumferential side.

The click portion 13d extends radially inward from the widthwise end surface of the track member 13. This click portion 13d is positioned inside the flange portion 14 in the width direction of the track member 13. Thus, the click portion 13d engages with a projection 16d of the retainer 16 to prevent the retainer 16 from sliding out of the other circumferential side.

The above rocking bearing outer ring 12 is produced, for example by a process of pressing a steel plate. More specifically, a roughly rectangular flat plate is obtained from the steel plate by a punching process. Then, the track member 13 and the flange portion 14 are formed by a bending process. More specifically, the track member 13 can be formed by curving the flat plate in its longitudinal direction so as to have a predetermined curvature. In addition, the flange portion 14 can be formed by folding each widthwise end portion of the flat plate so as to form a right angle with the track member 13.

In addition, the plurality of bending processes are performed in the step of forming the track member 13 to reach the predetermined curvature gradually. Similarly, the plurality of bending processes are performed in the step of forming the flange portion 14 to bend it gradually. In addition, it is preferable that the bending process for forming the track member 13 and the bending process for forming the flange portion 14 are alternately performed to reach the shape of the rocking bearing outer ring 12 gradually. In addition, the projection portion 14a is formed by bending the tip end of the flange portion 14 toward the widthwise inner side of the track member 13. In addition, the outward projection piece 13b, the inward projection piece 13c, and the click portion 13d are formed by bending processes.

Then, the rocking bearing outer ring 12 is subjected to a heat treatment to obtain a predetermined mechanical property. More specifically, a carbonitriding treatment or a carburizing treatment is performed. As a result, a mechanical property is obtained that the surface is hard and the inside is soft with high toughness. Furthermore, a tempering treatment is preferably performed after the above heat treatment in order to reduce residual stress and internal distortion generated in the above heat treatment, to improve the toughness, and to stabilize the dimension.

Next, the rocking bearing outer ring 12 is subjected to a barrel finishing treatment so that the surface roughness of the inner diameter surface of the track surface 13a may have a predetermined value or less. When the surface roughness of the track surface 13a is made to have the predetermined value or less, friction resistance between the track surface 13a and the roller 15 can be reduced and torque loss can be cut and heat generation can be reduced at the time of rocking. As a result, the long-lived and highly-reliable rocking bearing 11 can be provided.

Next, referring to FIG. 3, the retainer 16 includes a plurality of column parts 16a arranged at predetermined intervals in the circumferential direction, and a pair of arcuate connection portions 16b arranged at both longitudinal end portions of the column parts 16a, and a pocket 16c for holding the roller 15 is formed between the adjacent column parts 16a. In addition, the plurality of projections 16d projecting widthwise outward are arranged on the widthwise end surface of the connection portion 16b (the "wall surface opposed to the flange portion 14 after incorporated in the rocking bearing outer ring 12") at predetermined intervals in the circumferential direction.

Furthermore, a blank region 16e not having the pocket 16c is provided at each circumferential end portion of the retainer 16. The blank region 16e on the one circumferential side (left side in FIG. 1) prevents the roller 15 from rolling defectively due to the deformation of the pocket 16c when the circumferential end surface of the retainer 16 abuts on the inward projection piece 13c. On the other hand, since the blank region 16e on the other circumferential side (right side in FIG. 1) protrudes outside the rocking bearing outer ring 12 when the retainer 16 is maximally disposed on the other circumferential side, the roller 15 cannot be arranged therein.

The retainer 16 having the above configuration can be a resin retainer formed by injection-molding a resin material. More specifically, the resin material is fiber reinforced plastic (FRP) containing polyamide 46 as a mother material and a fibrous filler material as a reinforcing material. Here, as the fibrous filler material, carbon fiber reinforced plastic (CFRP) or glass fiber reinforced plastic (GFRP) may be employed.

In addition, a fibrous filler material content needs to be 5% or more by weight in order to obtain the mechanical property required in the retainer 16. However, when the fibrous filler material content is more than 20% by weight, the retainer is lowered in toughness and becomes brittle. In addition, since viscosity is high at the time of molding, it is difficult to form the retainer 16 with a mold and the like. As a result, the fibrous filler material content is preferably within a range of 5% by weight to 20% by weight.

A description will be made of a method of assembling the rocking bearing 11. First, the rollers 15 are put in the pockets 16c of the retainer 16. Then, the retainer 16 is inserted from the circumferential end region of the rocking bearing outer ring 12 not having the inward projection piece 13c, along the track surface 13a.

Then, referring to FIG. 4, the projection portion 14a provided at the tip end of the flange portion 14 holds the projection 16d of the retainer 16 from the radially inner side to prevent the retainer 16 from dropping out in the radial direction of the rocking bearing outer ring 12.

In addition, the wall surface of the projection 16d opposed to the flange portion 14 includes a slant surface 16f slanting in a direction so as to reduce the projection amount towards the radially outer side. In addition, the tip end of the projection portion 14a includes a slant surface 14b slanting in a direction so as to reduce the projection length of the projection portion 14a towards the radially inner side. The slant surfaces 14b and 16f function as insertion guide surfaces used when the retainer 16 is incorporated in the rocking bearing outer ring 12 in the radial direction. Thus, when the retainer 16 can be incorporated in the rocking bearing outer ring 12 in the radial direction, the assembly property of the rocking bearing 11 can be further improved.

In addition, although the projection 16d is held by the projection portion 14a from the radially inner side in the above embodiment, the connection portion 16b may be directly held by the projection portion 14a. In this case, the projection 16d may be omitted.

Here, it is to be noted that when the connection portion 16b is directly held by the projection portion 14a, the projection length of the flange portion 14 has to be longer than the thickness dimension of the retainer 16. Meanwhile, when the projection 16d is held by the projection portion 14a, the projection length of the flange portion 14 only has to be longer than the thickness dimension of the projection 16d. In other words, as shown in FIG. 4, when the projections 16d are only provided on the radially outer side of the retainer 16, the projection length of the flange portion 14 can be short. Therefore, for the purpose of shortening the projection length of the flange portion 16, it is desirable that the projection 16d is provided on the widthwise end surface of the retainer 16, and the projection portion 14a and the projection 16d engage with each other.

In addition, although the retainer 16 is made of polyamide 46 in the above embodiment, another resin may be used. In addition, a metal retainer produced by pressing a steel plate may be used instead of the resin retainer.

In addition, the outward projection piece 13b, the inward projection piece 13c, and the click portion 13d are not indispensable components in the present invention and may be omitted. In addition, although the click portion 13d engages with the projection 16d of the retainer 16 in the above embodiment, a projection that engages with the click portion 13d may be separately provided on the widthwise end surface of the retainer 16.

In addition, although the inward projection piece 13c and the click portion 13d are provided at the one circumferential side end portion and the other circumferential side end portion of the track member 13, respectively in the above embodiment, the click portion 13d may be omitted and the inward projection piece 13c may be provided at each circumferential end portion of the track member 13, or the inward projection piece 13c may be omitted and the click portion 13d may be provided at each circumferential end portion.

Figure 5:
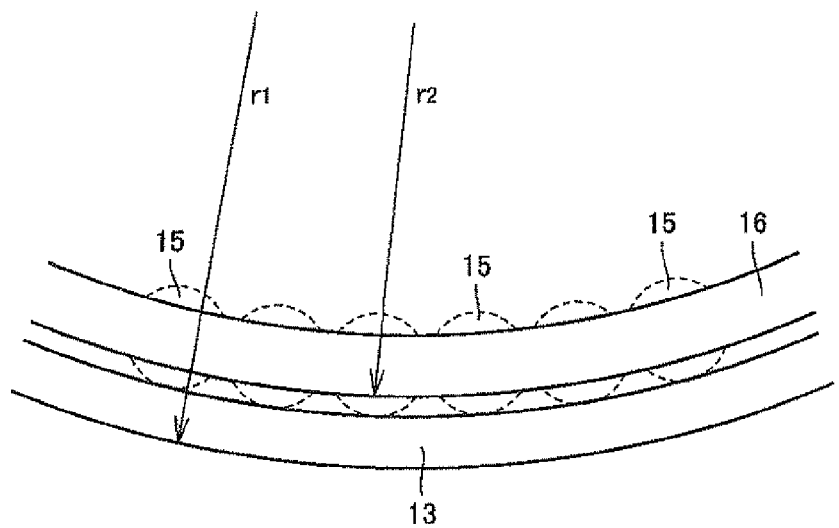
FIG. 5 is a view showing a relationship between curvature radiuses of the rocking bearing outer ring and the retainer.

Next, a description will be made of a method of building the rocking bearing outer ring 12 in a housing 1 with reference to FIGS. 5 to 7. In addition, FIG. 5 is a view showing a relationship between curvature radiuses of the track member 13 and the retainer 16, FIG. 6 is a view showing a state before the rocking bearing outer ring 12 is built in the housing 1, and FIG. 7 is a view showing a state after the rocking bearing outer ring 12 has been built in the housing 1.

Figure 6:
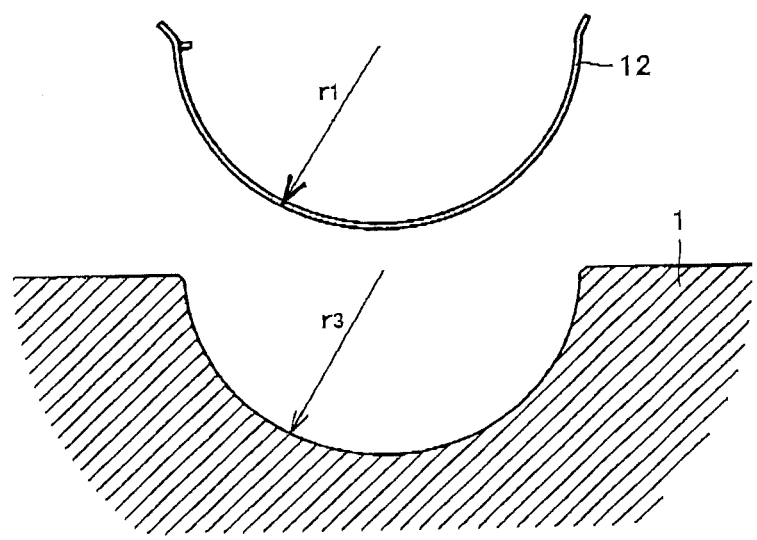
FIG. 6 is a view showing a state before the rocking bearing outer ring is built in a housing.
Figure 7:
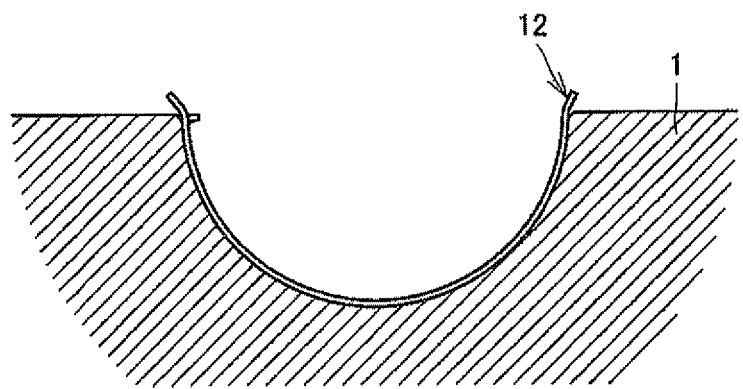
FIG. 7 is a view showing a state after the rocking bearing outer ring has been built in the housing.

First, referring to FIG. 6, when it is assumed that $r_1$ represents a curvature radius of the outer diameter of the rocking bearing outer ring 12 in a natural state (in which outer force is not applied), and $r_3$ represents a curvature radius of the inner diameter of the housing 1 for housing the rocking bearing outer ring 12, $r_1$ and $r_3$ are set so as to satisfy $1 < r_1/r_3 < 1.15$.

Then, the rocking bearing outer ring 12 is built in the housing 1 while pre-compression is applied to the rocking bearing outer ring 12 in a direction reducing its curvature radius. Thus, as shown in FIG. 7, the rocking bearing outer ring 12 is closely in contact with the housing 1 over the whole region of its outer diameter surface.

Figure 26:
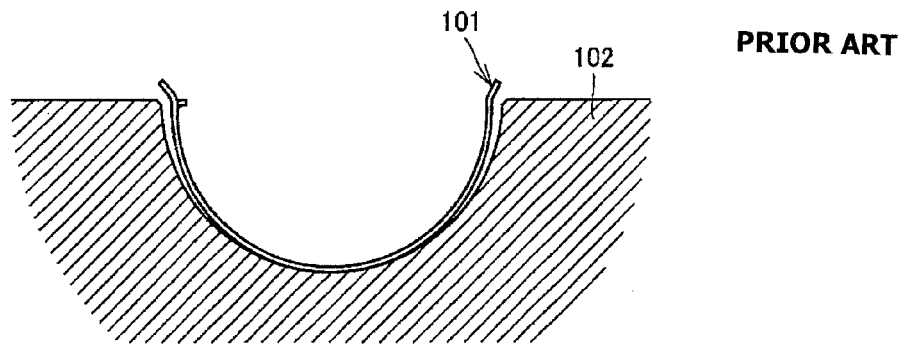
FIG. 26 is a view showing one example of a conventional rocking bearing outer ring built in a housing.
Figure 27:
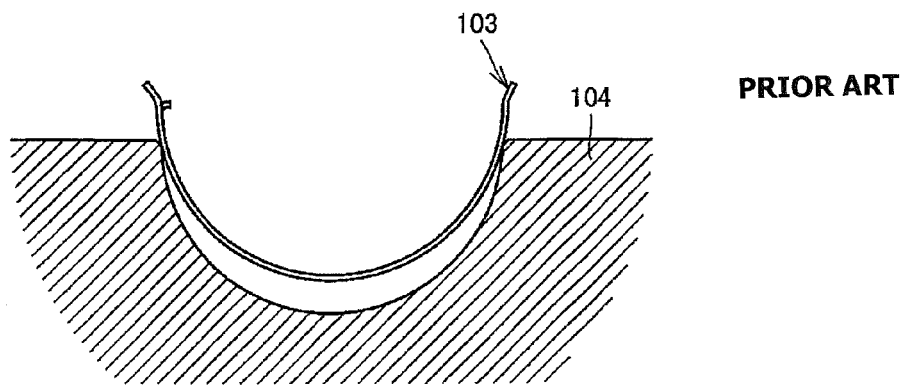
FIG. 27 is a view showing another example of a conventional rocking bearing outer ring built in a housing.

Here, when $r_1/r_3 < 1$, as described above with reference to FIG. 26, a gap is generated between the rocking bearing outer ring 12 and the housing 1, and the rocking bearing 11 wobbles at the time of rocking operation. Meanwhile, when $r_1/r_3 > 1.15$, the pre-compression applied when the rocking bearing outer ring 12 is built in the housing 1 becomes too high, and the rotation torque is increased at the time of rocking operation. Especially, since the rocking bearing outer ring 12 has the flange portion 14 at each widthwise end portion of the whole circumferential region, and its rigidity is high, so that high pre-compression is needed to bring the rocking bearing outer ring 12 closely into contact with the housing 1.

However, the increase in pre-compression causes abnormal heat generation in the rocking bearing 11, and as a result, decreases the life span of the rocking bearing. Thus, when the curvature radiuses $r_1$ and $r_3$ of the rocking bearing outer ring 12 and the housing 1, respectively are set to satisfy the above relationship, the rocking bearing outer ring 12 can be closely in contact with the housing 1 by suitable pre-compression.

In addition, the above description is similarly applied to the case where the rocking bearing outer ring 12 having the incorporated rollers 15 and retainer 16 as shown in FIG. 1 is built in the housing 1.

Next, referring to FIG. 5, when it is assumed that $r_1$ represents a curvature radius of the outer diameter of the rocking bearing outer ring 12 and $r_2$ represents a curvature radius of the outer diameter of the retainer 16 built in the rocking bearing outer ring 12, $r_1$ and $r_2$ are set so as to satisfy that $1 < r_1/r_2 < 1.15$.

Here, since the retainer 16 is positioned on the inner side of the track surface of the rocking bearing outer ring 12, the relation $r_1/r_2 > 1$ is always established. In addition, since the relationship $r_2 < r_3$ is also always established, $r_1/r_3 < 1.15$ is established as long as the relationship $r_1/r_2 < 1.15$ is satisfied.

Figure 10:
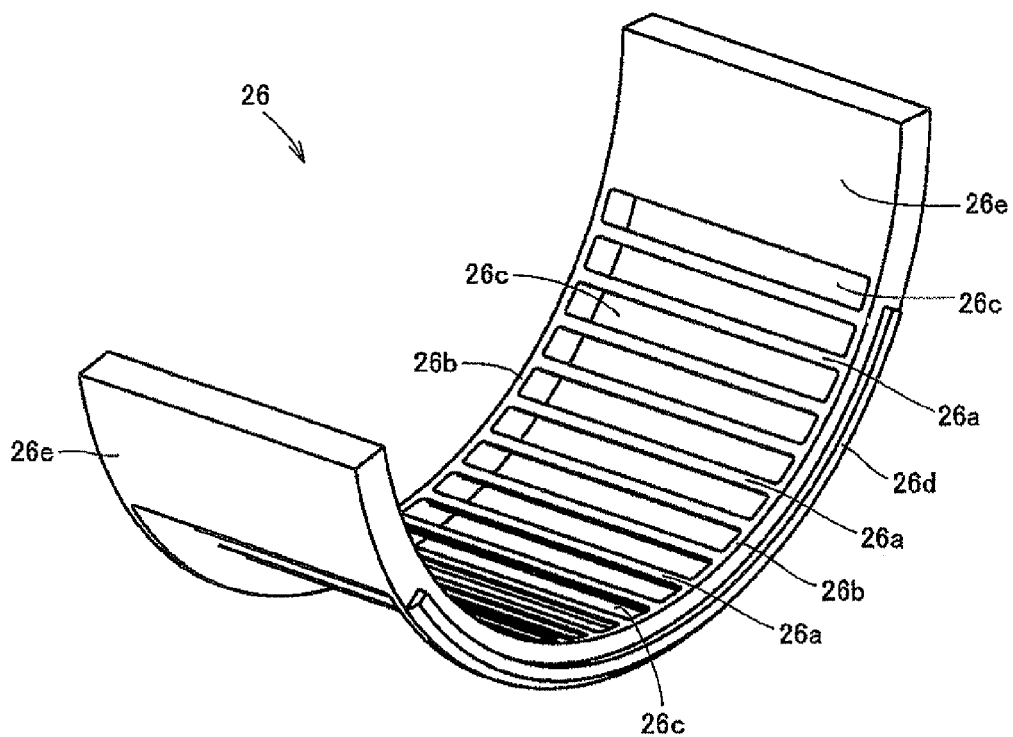
FIG. 10 is a perspective view of a retainer shown in FIG. 8.
Figure 11:
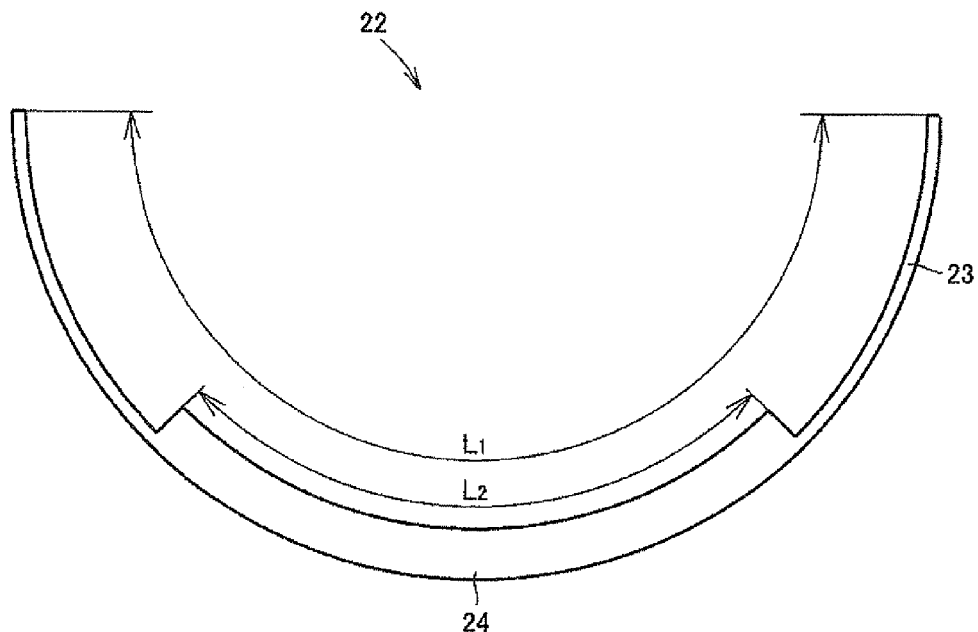
FIG. 11 is a view taken from a direction of an arrow XI in FIG. 9.
Figure 12:
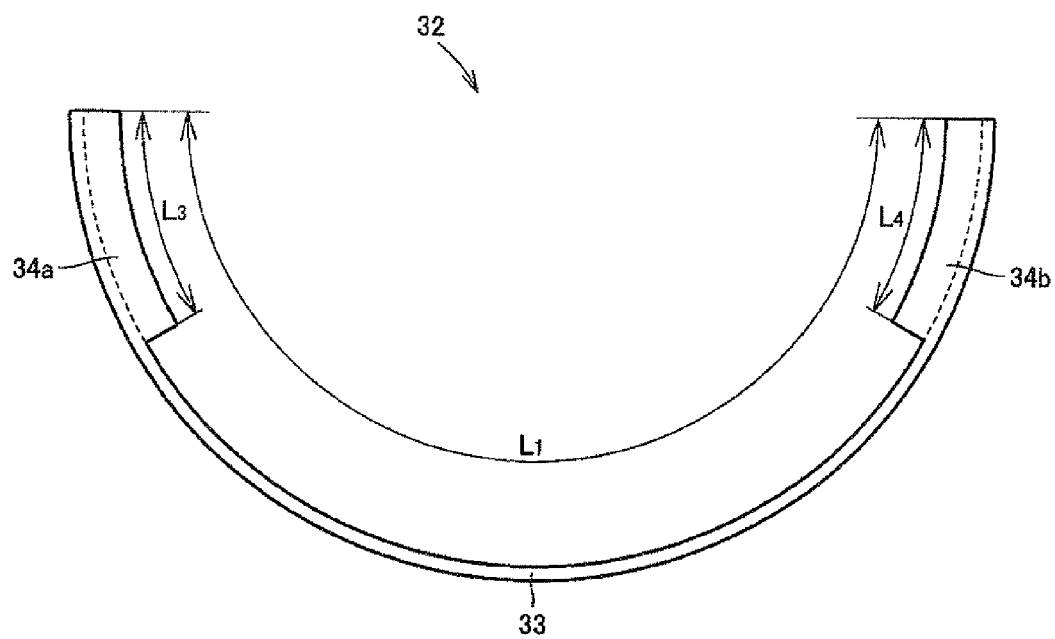
FIG. 12 is a view showing another embodiment of FIG. 11.

A rocking bearing 21 according to another embodiment of the present invention will be described with reference to FIGS. 8 to 12. In addition, a description of a part similar to that of the rocking bearing 11 will not be reiterated and only a different part will be described hereinafter. In addition, FIG. 8 is a perspective view of the rocking bearing 21, FIG. 9 is a perspective view of a rocking bearing outer ring 22, FIG. 10 is a perspective view of a retainer 26, FIG. 11 is a view taken from a direction of an arrow XI in FIG. 9, and FIG. 12 is a view showing another embodiment of that shown in FIG. 11.

Figure 8:
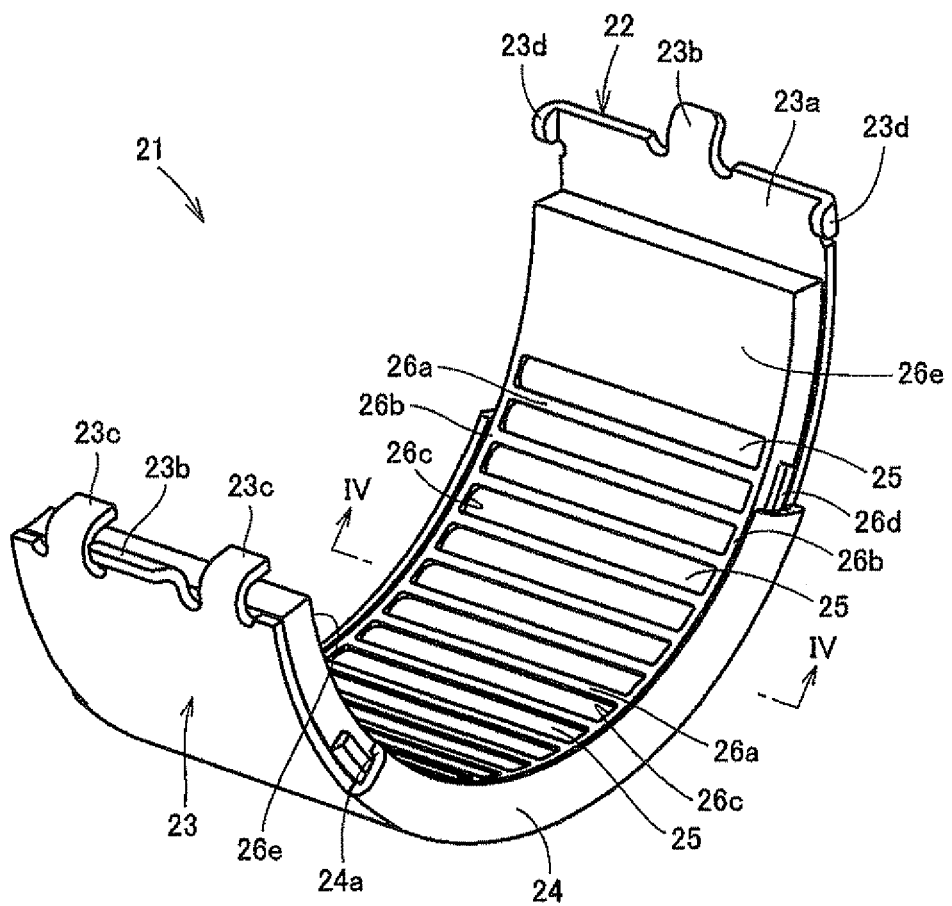
FIG. 8 is a perspective view showing a rocking bearing according to another embodiment of the present invention.

First, referring to FIG. 8, the rocking bearing 21 includes the rocking bearing outer ring 22, a plurality of rollers 25 arranged along an inner diameter surface of the rocking bearing outer ring 22, and the retainer 26 retaining the plurality of rollers 25.

Figure 9:
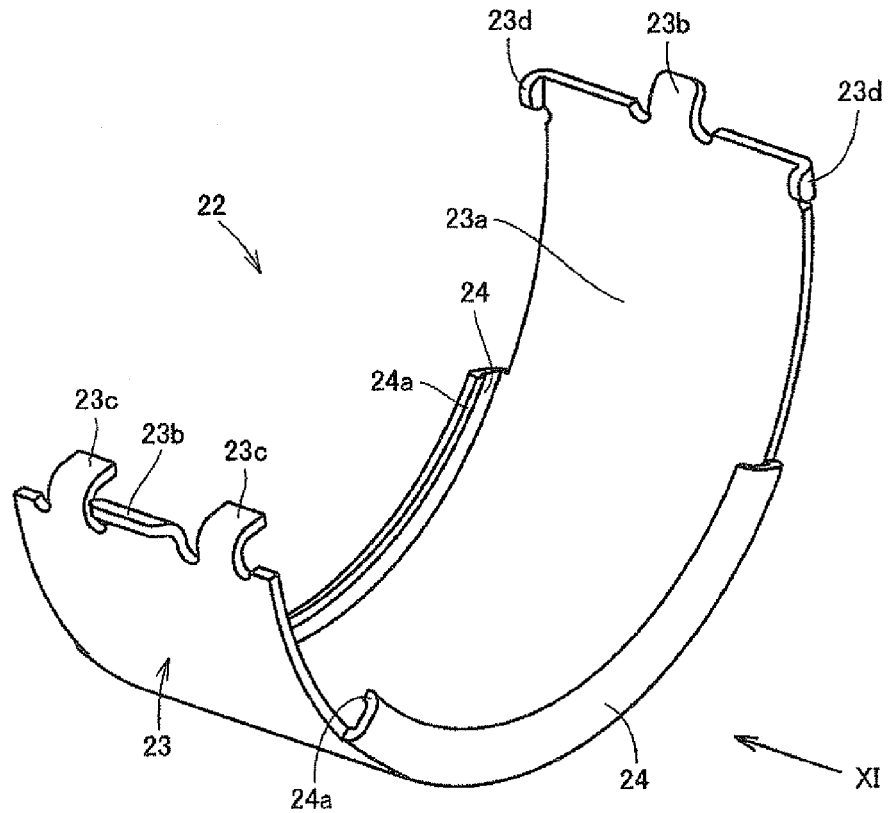
FIG. 9 is a perspective view of a rocking bearing outer ring shown in FIG. 8.

Next, referring to FIG. 9, the rocking bearing outer ring 22 includes a track member 23 of an arcuate shape (semi-circular shape having a center angle of 180° in this embodiment) having a track surface 23a along its inner diameter surface, and a flange portion 24 projecting radially inward from each widthwise end portion of the track member 23 to regulate the widthwise movements of the rollers 25 and the retainer 26.

The track member 23 has an outward projection piece 23b provided at each circumferential end portion, an inward projection piece 23c provided at one circumferential end portion (left side in FIG. 8), and a click portion 23d provided at the other circumferential end portion (right side in FIG. 8). The flange portion 24 has a projection portion 24a extending widthwise inward of the track member 23 from its tip end.

In addition, since the configurations and functions of the outward projection piece 23b, the inward projection piece 23c, the click portion 23d, and the projection portion 24a are similar to the outward projection piece 13b, the inward projection piece 13c, the click portion 13d, and the projection portion 14a, respectively, their descriptions will not be reiterated. In addition, since the cross-sectional view taken along a line IV-IV in FIG. 8 is similar to FIG. 4, its description will not be reiterated.

Next, referring to FIG. 11, the flange portion 24 is formed at only circumferential one part of the track member 23. More specifically, the flange portion 24 is positioned at a circumferential center region (the "region including the rocking center of the rocking bearing 21") of the track member 23. Thus, when it is assumed that $L_1$ represents a circumferential length of the track member 23, and $L_2$ represents a circumferential length of the flange portion 24, the circumferential length $L_2$ of the flange portion 24 is set so as to satisfy $0.2 \leq L_2/L_1 \leq 0.8$.

Here, when $L_2/L_1 \leq 0.8$, the rigidity of the rocking bearing outer ring 22 can be sufficiently lowered. Meanwhile, when $L_2/L_1 < 0.2$, the rigidity of the flange portion 24 is too low, the flange portion 24 cannot appropriately regulate the widthwise movement of the retainer 26. As a result, the retainer 26 largely leans in the circumferential direction in the rocking bearing 21, so that the behavior of the rollers 25 and the retainer 26 become unstable.

Thus, as described above, when the flange portion 24 is formed only circumferential one part of the track member 23, the rigidity of the rocking bearing outer ring 22 can be lowered. As a result, the rocking bearing outer ring 22 can be closely in contact with the housing by suitable pre-compression, and the widthwise movement of the retainer 26 can be favorably regulated.

In addition, in FIG. 11, the outward projection piece 23b, the inward projection piece 23c, and the click portion 23d are omitted. In addition, since the click portion 23d has a role different from that of the flange portion 24, the click portion 23d is not contained in the circumferential length $L_2$ of the flange portion 24.

Since a method of producing the rocking bearing outer ring 22 is similar to that of the rocking bearing outer ring 12, its detailed description will not be reiterated. In addition, since the flange portion 24 is formed only at the circumferential one part of the track member 23 in this embodiment, the track member 23 and the flange portion 24 can be easily formed as compared with the case where the flange portion 14 is provided throughout the circumferential region of the track member 13 as shown in FIG. 1.

Next, referring to FIG. 10, the retainer 26 includes a plurality of column portions 26a arranged in the circumferential direction at predetermined intervals, and a pair of arcuate connection portions 26b arranged at both longitudinal end portions of the column portions 26a, and a pocket 26c housing the roller 25 is formed between the adjacent column portions 26a. In addition, a circumferentially continuous projection strip 26d is formed on the widthwise end surface (the "wall surface opposed to the flange portion 24 after incorporated in the rocking bearing outer ring 22") of the connection portion 26b.

Furthermore, a blank region 26e not having the pocket 26c is provided at circumferential each end portion of the retainer 26. The blank region 26e on the one circumferential side (left side in FIG. 8) is provided to prevent the roller 25 from defectively rolling due to the deformation of the pocket 26c when the circumferential end surface of the retainer 26 abuts on the inward projection piece 23c. On the other hand, since the blank region 26e on the other circumferential side (right side in FIG. 8) protrudes outside the rocking bearing outer ring 22 when the retainer 26 is maximally disposed on the other circumferential side, the roller 25 cannot be arranged therein.

A description will be made of a method of assembling the above rocking bearing 21. First, the rollers 25 are put in the pockets 26c of the retainer 26. Then, the retainer 26 is inserted from the circumferential end region of the rocking bearing outer ring 22 not having the flange portion 24, along the track surface 23a.

In addition, when the retainer 16 shown in FIG. 3 is built in the rocking bearing outer ring 22 shown in FIG. 9, in the above embodiment, the projection 16d is caught by the circumferential end portion of the flange portion 24, which prevents the rocking bearing from smoothly rocking. Thus, the retainer 26 shown in FIG. 10 is suitable for the rocking bearing outer ring 22. Meanwhile, the retainer 26 shown in FIG. 10 may be built in the rocking bearing outer ring 12 shown in FIG. 2.

In addition, although the flange portion 24 is arranged at the circumferential center region of the track member 23 in the above embodiment, any number of them may be provided at any position. A rocking bearing outer ring 32 according to another embodiment will be described with reference to FIG. 12. FIG. 12 is a view of the rocking bearing outer ring 32 and corresponds to FIG. 11. In addition, a description for a part similar to that of the rocking bearing outer ring 22 will not be reiterated and a different point will be described.

Referring to FIG. 12, the rocking bearing outer ring 32 includes a track member 33, flange portions 34a and 34b (collectively referred to as the "flange portion 34"). The flange portion 34a is arranged at an end region on one circumferential side (left side in FIG. 12) of the track member 33, and the flange portion 34b is arranged at an end region on the other circumferential side (right side in FIG. 12) of the track member 33.

Thus, even when the flange portions 34a and 34b are provided at certain positions, the effect of the present invention can be obtained as long as a circumferential length $L_1$ of the track member 33 and a circumferential length $L_2$ of the flange portion 34 satisfy that $0.2 \leq L_2/L_1 \leq 0.8$. In addition, the circumferential length $L_2$ of the flange portion 34 in this case is equal to the sum of a circumferential length $L_3$ of the flange portion 34a and a circumferential length $L_4$ of the flange portion 34b.

A rocking bearing 41 according to still another embodiment of the present invention will be described with reference to FIGS. 13 and 14. In addition, a description of a part similar to that of the rocking bearings 11 and 12 will not be reiterated and only a different part will be described hereinafter. In addition, FIG. 13 is a perspective view of the rocking bearing 41, and FIG. 14 is a perspective view of a rocking bearing outer ring 42.

Figure 13:
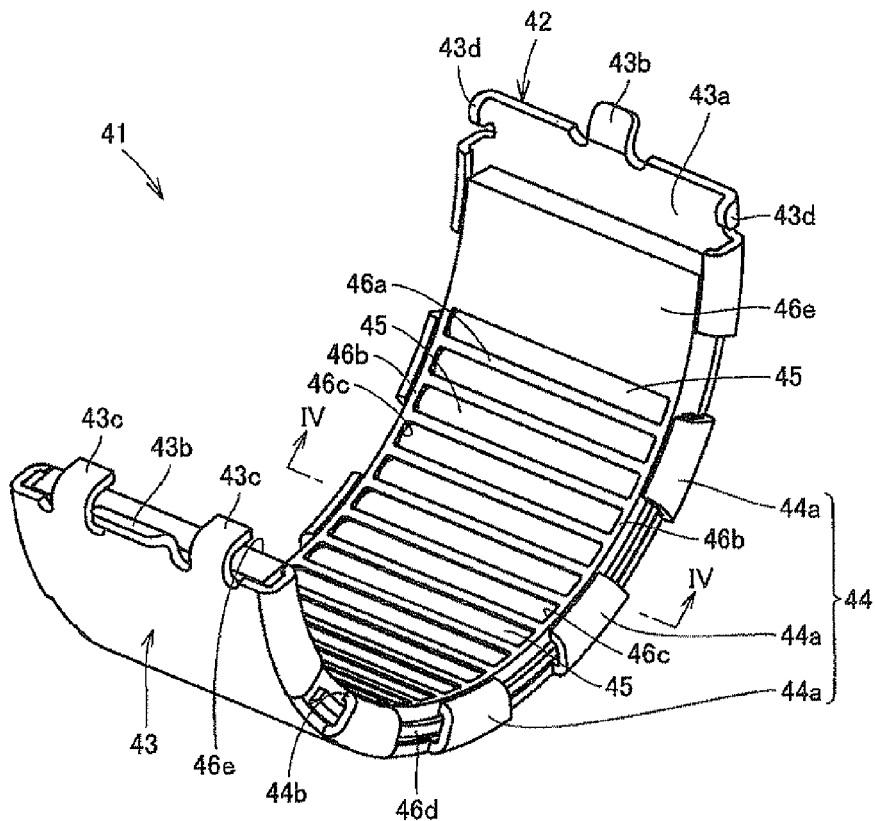
FIG. 13 is a perspective view of a rocking bearing according to still another embodiment of the present invention.

First, referring to FIG. 13, the rocking bearing 41 includes the rocking bearing outer ring 42, a plurality of rollers 45 arranged along an inner diameter surface of the rocking bearing outer ring 42, and a retainer 46 for retaining the plurality of rollers 45. In addition, since the retainer 46 is similar to the retainer 26 shown in FIG. 10, its description will not be reiterated.

Figure 14:
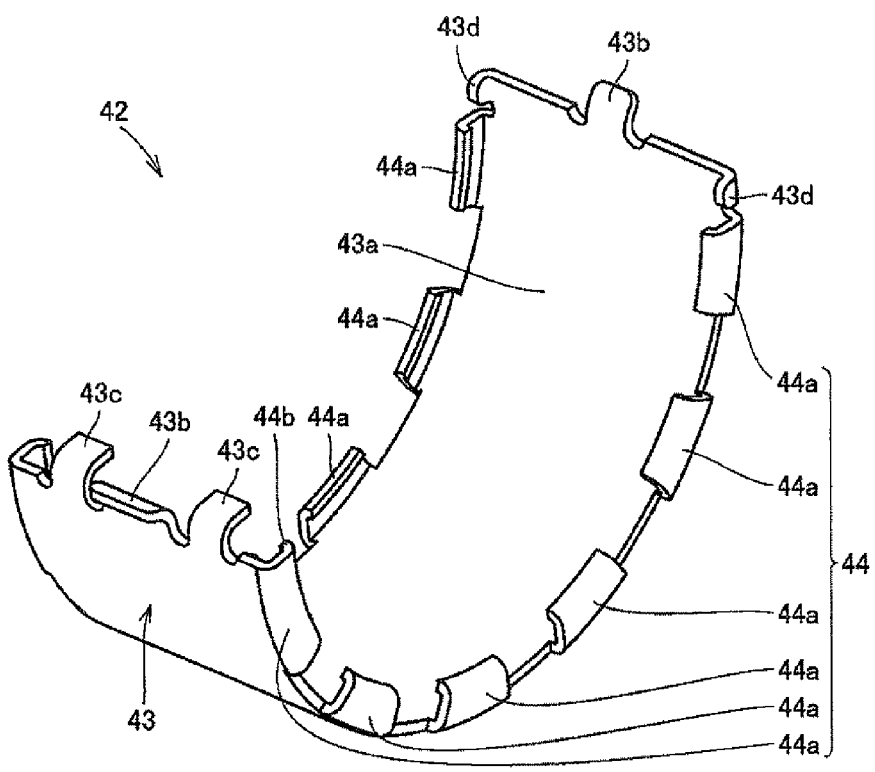
FIG. 14 is a perspective view of a rocking bearing outer ring shown in FIG. 13.

Next, referring to FIG. 14, the rocking bearing outer ring 42 includes a track member 43 of an arcuate shape (semi-circular shape having a center angle of 180° in this embodiment) having a track surface 43a along its inner diameter surface, and a flange portion 44 projecting radially inward from each widthwise end portion of the track member 43 to regulate the widthwise movements of the rollers 45 and the retainer 46.

The track member 43 has an outward projection piece 43b provided at each circumferential end portion, an inward projection piece 43c provided at one circumferential end portion (left side in FIG. 13), and a click portion 43d provided at the other circumferential end portion (right side in FIG. 13).

In addition, since the configurations and functions of the outward projection piece 43b, the inward projection piece 43c, the click portion 43d, and a projection portion 44a are similar to the outward projection piece 13b, the inward projection piece 13c, the click portion 13d, and the projection portion 14a, respectively, their descriptions will not be reiterated. In addition, since the cross-sectional view taken along a line IV-IV in FIG. 13 is similar to FIG. 4, its description will not be reiterated.

Figure 14A:
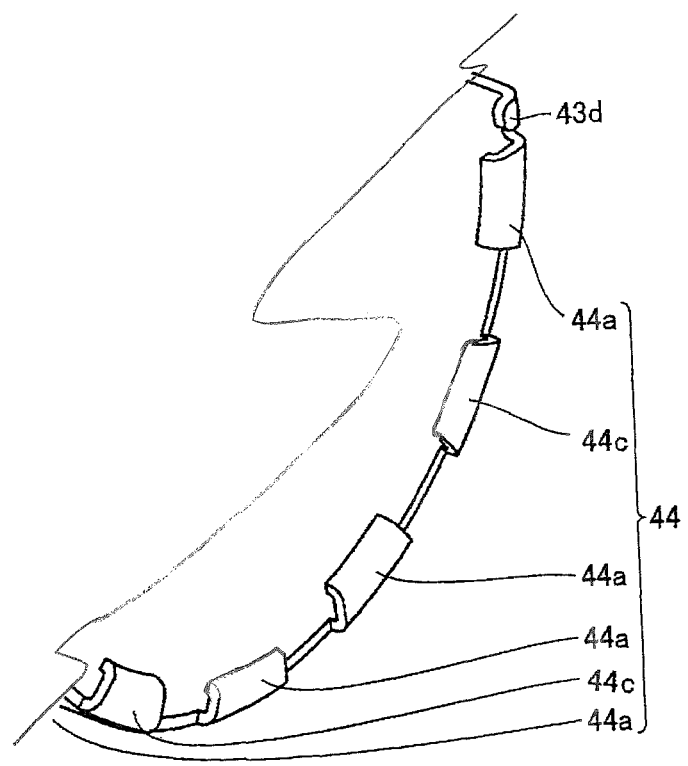
FIG. 14A shows a partial perspective view of the rocking bearing outer ring of FIG. 14 with first and second flange portions.

The flange portion 44 includes a first flange portion 44a, and a second flange portion (not shown) provided so as to be circumferentially adjacent to the first flange portion 44a and having a projection length relatively smaller than that of the first flange portion 44a. Here, it is to be noted that the projection length of the second flange portion is 0 mm in this embodiment, that is, the second flange portion is not provided. In addition, the first flange portion 44a has a projection portion 44b extending widthwise inward of the track member 43 from its tip end. FIG. 14A shows the first flange portion 44a and a second flange portion 44c, with its projection length shorter than the first flange portion 44a.

As described above, when the circumferential flange portion 44 is partially reduced in projection length, the rigidity of the rocking bearing outer ring 42 can be lowered. As a result, the rocking bearing outer ring 42 can be closely in contact with the housing by suitable pre-compression.

Since a method of producing the rocking bearing outer ring 42 is similar to that of the rocking bearing outer ring 12, a detailed description will not be reiterated. In addition, according to this embodiment, since the flange portion 44 is formed only at the circumferential one part of the track member 43 (there is no flange portion between the adjacent first flange portions 44a), the track member 43 and the flange portion 44 can be easily formed as compared with the case where the flange portion is provided throughout the circumferential region of the track member.

In addition, although the first flange portions 44a are arranged in the circumferential direction at predetermined intervals in the above embodiment (the projection length of the second flange portion is 0 mm) in the above embodiment, the second flange portion may be provided at the position circumferentially adjacent to the first flange portions 44a. As long as the projection length of the second flange portion is smaller than that of the first flange portion 44a, and the projection portion extending widthwise inward of the track member 43 is not provided at the tip end of the second flange portion, the rigidity can be lowered as compared with that of the conventional rocking bearing outer ring.

A rocking bearing 51 according to still another embodiment of the present invention will be described with reference to FIGS. 15 to 17. In this embodiment, a description of a part similar to that of the rocking bearings 11, 21, and 41 will not be reiterated and only a different part will be described hereinafter. In addition, FIG. 15 is a perspective view of the rocking bearing 51, FIG. 16 is a perspective view of a rocking bearing outer ring 52 shown in FIG. 15, and FIG. 17 is a cross-sectional view taken along a line XVII-XVII in FIG. 15.

Figure 15:
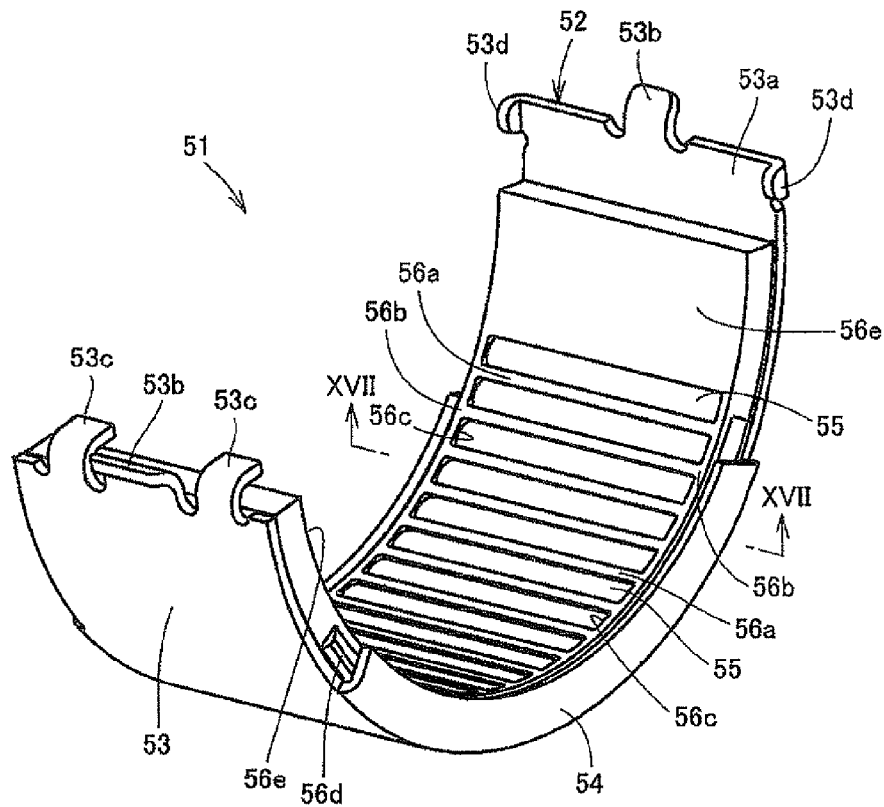
FIG. 15 is a perspective view of a rocking bearing according to still another embodiment of the present invention.

First, referring to FIG. 15, the rocking bearing 51 includes the rocking bearing outer ring 52, a plurality of rollers 55 arranged along an inner diameter surface of the rocking bearing outer ring 52, and a retainer 56 for retaining the plurality of rollers 55. In addition, since the retainer 56 is similar to the retainer 26 shown in FIG. 10, its detailed description will not be reiterated.

Figure 16:
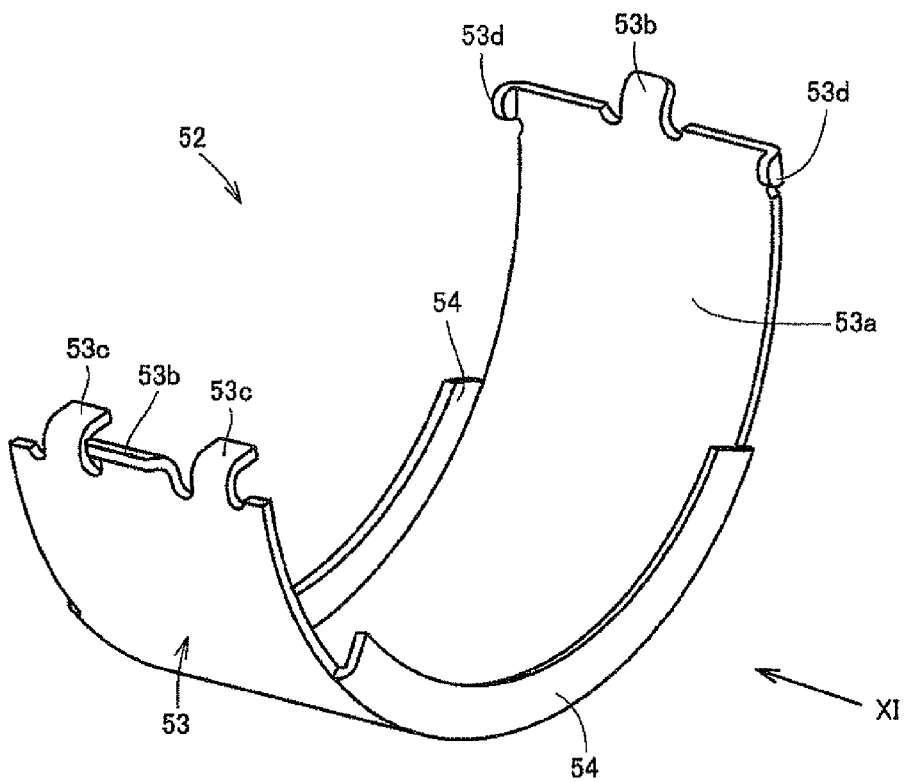
FIG. 16 is a perspective view of the rocking bearing outer ring shown in FIG. 2.
Figure 17:
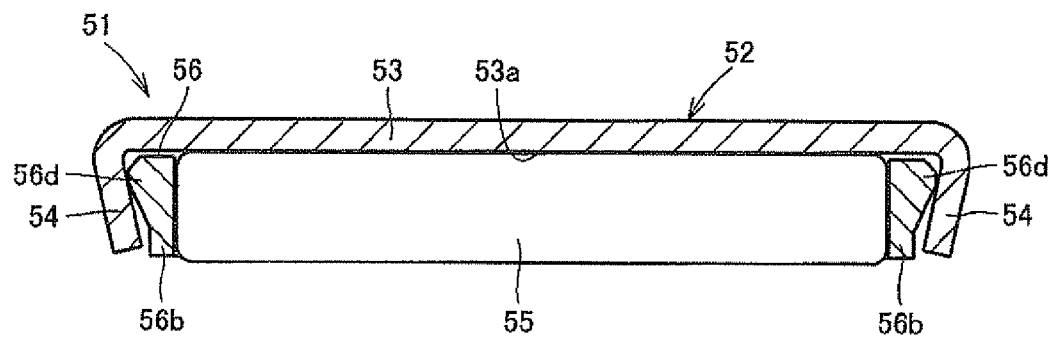
FIG. 17 is a cross-sectional view taken along a line XVII-XVII in FIG. 15.

Next, referring to FIGS. 16 and 17, the rocking bearing outer ring 52 includes a track member 53 of an arcuate shape (semi-circular shape having a center angle of 180° in this embodiment) having a track surface 53a along its inner diameter surface, and a flange portion 54 projecting radially inward from each widthwise end portion of the track member 53 to regulate the widthwise movements of the rollers 55 and the retainer 56.

The track member 53 has an outward projection piece 53b provided at each circumferential end portion, an inward projection piece 53c provided at one circumferential end portion (left side in FIG. 15), and a click portion 53d provided at the other circumferential end portion (right side in FIG. 15). The flange portion 54 extends radially inward from each widthwise end portion of the track member 53 so as to form an acute angle with the track surface 53a.

In addition, since the configurations and functions of the outward projection piece 53b, the inward projection piece 53c, and the click portion 53d are similar to the outward projection piece 13b, the inward projection piece 13c, and the click portion 13d, respectively, their descriptions will not be reiterated. In addition, since the cross-sectional view taken along a direction of an arrow XI in FIG. 16 is similar to FIG. 11, its description will not be reiterated.

Next, referring to FIG. 17, the retainer 56 is positioned at a region surrounded by the track surface 53a and the pair of flange portions 54. In addition, a distance between the tip ends of the flange portions 54 is set so as to be shorter than a maximum width dimension of the retainer 56. More specifically, a line length connecting top points of right and left projection strips 56d means the maximum width dimension of the retainer 56. In addition, the tip end of the flange portion 54 is positioned on the radially inside the projection strip 56d, and retains the projection strip 56d from the radially inner side. The above configuration prevents the retainer 56 from sliding out in the radial direction of the rocking bearing outer ring 52.

Since a method of producing the rocking bearing outer ring 52 is similar to that of the rocking bearing outer ring 52, its detailed description will not be reiterated. In addition, in a step of forming the flange portion 54, each lateral end portion of a flat plate is folded so as to form an acute angle with the track surface 53a.

In addition, although the flange portion 54 is provided only the one circumferential part of the track member 53 in the above embodiment, it may be provided throughout the circumferential region of the track member as shown in FIG. 2. In this case, the retainer 56 may be either the retainer 16 shown in FIG. 3 or the retainer 26 shown in FIG. 10.

Next, a rocking bearing 61 according to still another embodiment of the present invention will be described with reference to FIGS. 18 and 19. In addition, a description of a part similar to that of the rocking bearing 11 will not be reiterated and only a different part will be described hereinafter. In addition, FIG. 18 is a perspective view of the rocking bearing 61, and FIG. 19 is a perspective view of a rocking bearing outer ring 62.

Figure 18:
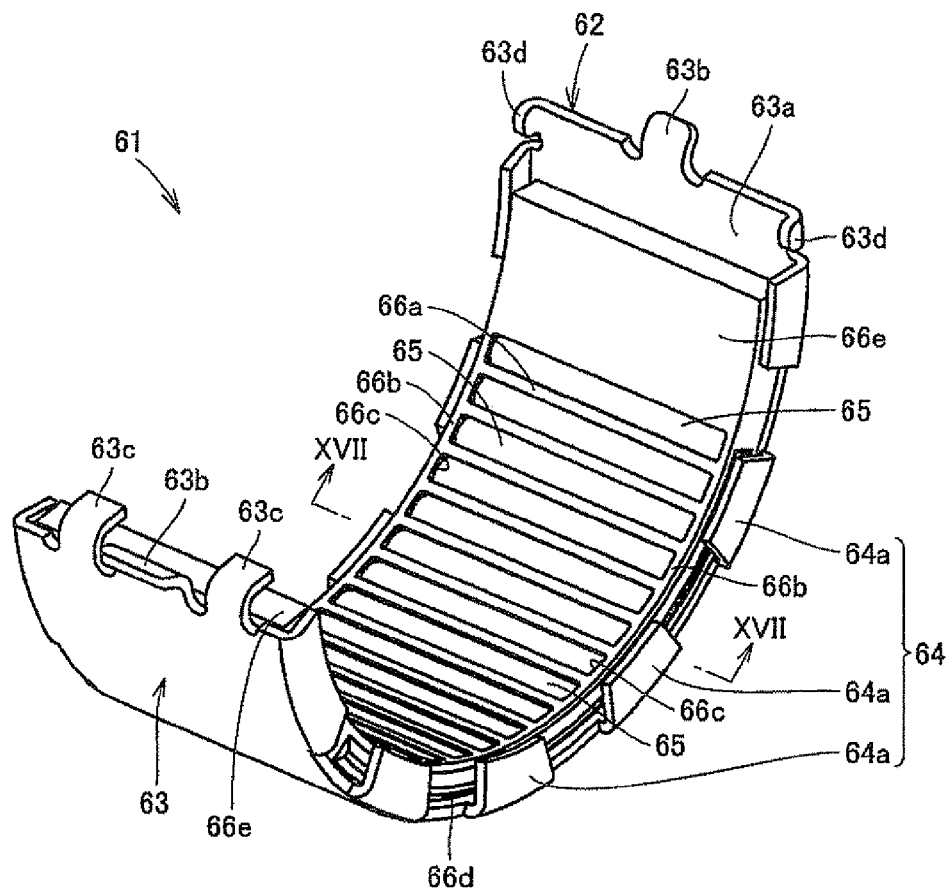
FIG. 18 is a perspective view of a rocking bearing according to another embodiment of the present invention.

First, referring to FIG. 18, the rocking bearing 61 includes the rocking bearing outer ring 62, a plurality of rollers 65 arranged along an inner diameter surface of the rocking bearing outer ring 62, and a retainer 66 for retaining the plurality of rollers 65. In addition, since the retainer 66 is similar to the retainer 26 shown in FIG. 10, its description will not be reiterated.

Figure 19:
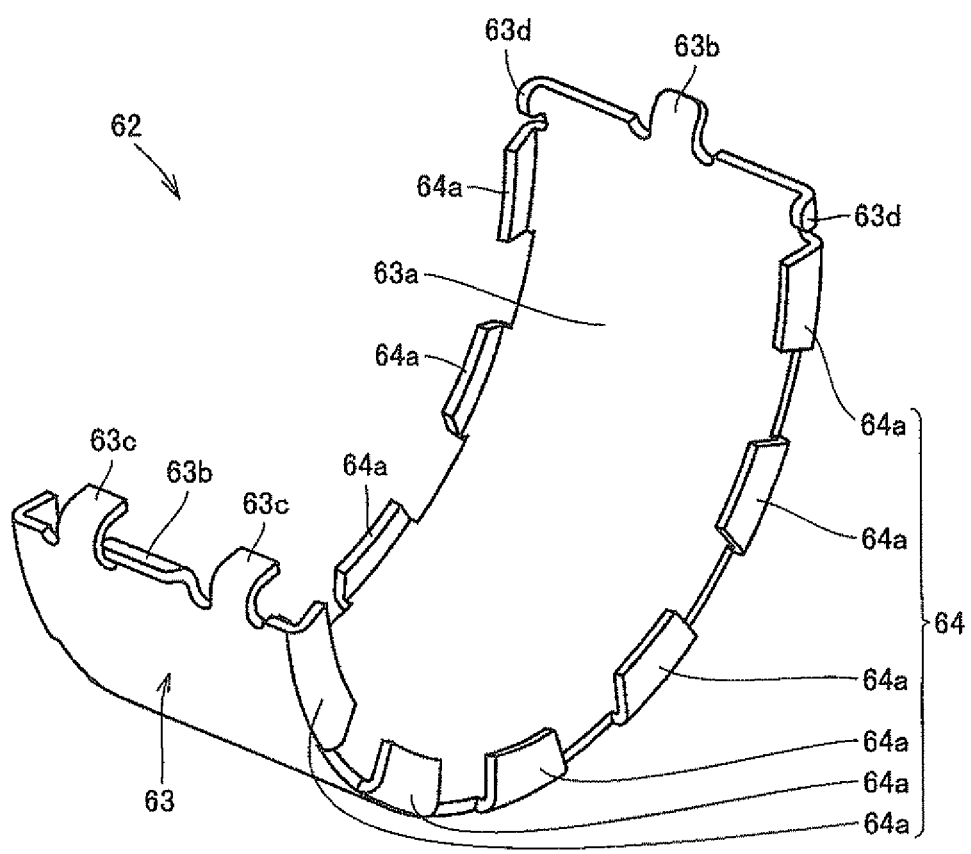
FIG. 19 is a perspective view of a rocking bearing outer ring shown in FIG. 18.

Next, referring to FIG. 19, the rocking bearing outer ring 62 includes a track member 63 of an arcuate shape (semicircular shape having a center angle of 180° in this embodiment) having a track surface 63a along an inner diameter surface, and a flange portion 64 projecting radially inward from each widthwise end portion of the track member 63 to regulate the widthwise movement of the rollers 65 and the retainer 66.

The track member 63 has an outward projection piece 63b provided at each circumferential end portion, an inward projection piece 63c provided at one circumferential end portion (left side in FIG. 19), and a click portion 63d provided at the other circumferential end portion (right side in FIG. 19).

In addition, since the configurations and functions of the outward projection piece 63b, the inward projection piece 63c, and the click portion 63d are similar to the outward projection piece 43b, the inward projection piece 43c, and the click portion 43d, respectively, their descriptions will not be reiterated. In addition, since the cross-sectional view taken along a line XVII-XVII in FIG. 18 is similar to FIG. 17, its description will not be reiterated.

The flange portion 64 includes a first flange portion 64a and a second flange portion (not shown) provided so as to be circumferentially adjacent to the first flange portion 64a and having a projection length relatively smaller than that of the first flange portion 64a. Here, it is to be noted that the projection length of the second flange portion is 0 mm in this embodiment, that is, the second flange portion is not provided. In addition, the first flange portion 64a extends radially inward from each widthwise end portion of the track member 63 so as to form an acute angle with the track surface 63a.

The effect of the present invention can be obtained in the above configuration also. In addition, since the circumferential part of the flange portion 64 is partially reduced in projection length, the rigidity of the rocking bearing outer ring 62 can be lowered. As a result, the rocking bearing outer ring 62 can be closely in contact with the housing by suitable precompression.

Since a method of producing the rocking bearing outer ring 62 is similar to that of the rocking bearing outer ring 42, its detailed description will not be reiterated. In addition, in a step of forming the flange portion 64, each lateral end portion of a flat plate is folded so as to form an acute angle with the track surface 63a.

In each of the above embodiments, in order to improve lubrication performance at the time of rocking operation, numerous fine dents are provided at random at least in the surface of the roller (rolling surface especially), or also in the track surface of the rocking bearing outer ring. As a result, oil film forming capability is improved, and a long life can be implemented even under the condition that a oil film thickness is extremely thin due to dilute lubrication.

At this time, a surface roughness parameter Rqni of the surface having the dents is set to 1.10 or more, and its Sk value is set to −1.6 or less, and an area ratio of the dents to a surface area of the bearing component (the "roller" and the "rocking bearing outer ring") is set within a range of 10% to 40%. As its processing method, while a desired finishing surface can be obtained by specific barrel finishing, it can be obtained by a shot-peening process, a shot-blast process and the like. In addition, such process is called a HL (High Lubrication) processing, and the surface provided by the HL processing is called a HL surface.

In addition, "Rqni" represents a square root of a value obtained by integrating the square of height deviation from a roughness center line to a roughness curve in a measurement length interval and averaging it in that interval, and it is also called root-mean-square roughness (ISO4287:1997).

Thus, the fine dent serves as an oil pool, and oil film formation is improved, and the surface can be considerably prevented from being damaged. In addition, when the area ratio of the dents is less than 10%, the number of the fine dents is too small, so that the long-life effect is reduced. Meanwhile, when the area ratio of the dents is more than 40%, a contact area between the track surface and the roller is reduced, so that the long-life effect is also reduced.

One example of a method of measuring the Rqni and Sk value and a condition thereof will be shown below. When the surface texture of the roller, for example is measured by this measurement method, one measurement value is reliable as a representative value, but more reliable measurement result can be obtained by measuring the two radially opposed positions.

Parameter calculation standard: Gaussian
Measurement length: 5λ
Cutoff wavelength: 0.25 mm
Measurement magnification: 10000 times
Measurement speed: 0.30 mm/s
Measurement position: roller center portion
Measurement number: two
Measurement device: surface roughness tester Surfcom 1400A (Tokyo Seimitsu Co., Ltd.)

In addition, quantitative measurement of the dents can be performed by zooming the roller surface and analyzing its image with a commercially available image analysis system. Moreover, the measurement can be stably performed with high accuracy by a surface inspection method and a surface texture inspection device disclosed in Japanese Unexamined Patent Publication No. 2001-186424. When the quantitative measurement of the dents is performed by this method, a white part and a black part of the image are analyzed as a surface flat part and fine dents, respectively.

One example of a measurement condition by the measurement device disclosed in the above patent document will be shown below. In this case also, one measurement value is reliable as a representative value, but a more reliable measurement result can be obtained by measuring two or more positions.

Observation field: 826 μm×620 μm (When a roller diameter is less than φ4, 413 μm×640 μm is desirable)

Measurement position: roller center portion

Measurement number: two

Figure 20:
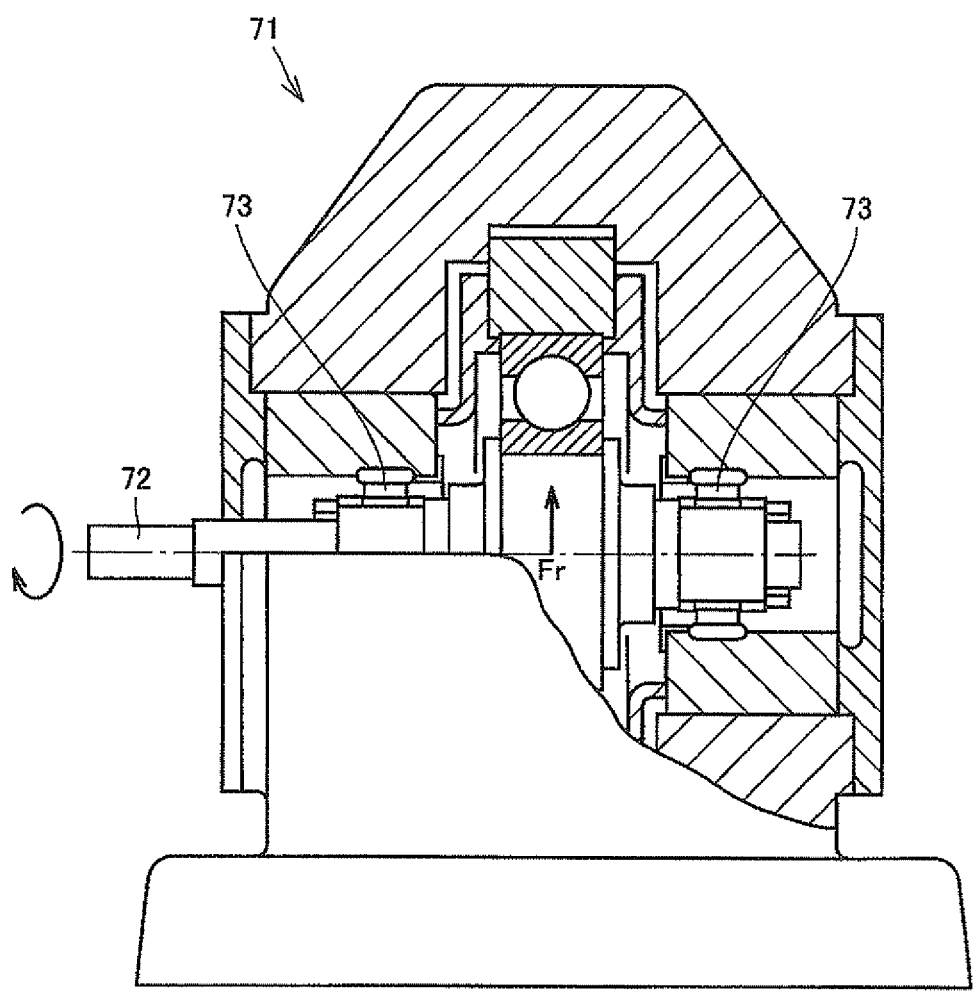
FIG. 20 is a schematic view of a radial load test machine used in a test to confirm the effect of the present invention.

Then, in order to confirm the effect of the present invention, a rotation test was performed with a radial load test machine 71 as shown in FIG. 20 by applying a load to a test bearing 73 mounted on each side of a rotation shaft 72. In addition, surface roughness Ra of the rotation shaft 72 and a track ring of the test bearing 73 is set within a range of 0.10 μm to 0.16 μm, and a test condition was as follows.

Bearing radial load: 2000 kgf

Rotation speed: 4000 rpm

Lubricant oil: CLESAFE oil H46

Figure 21:
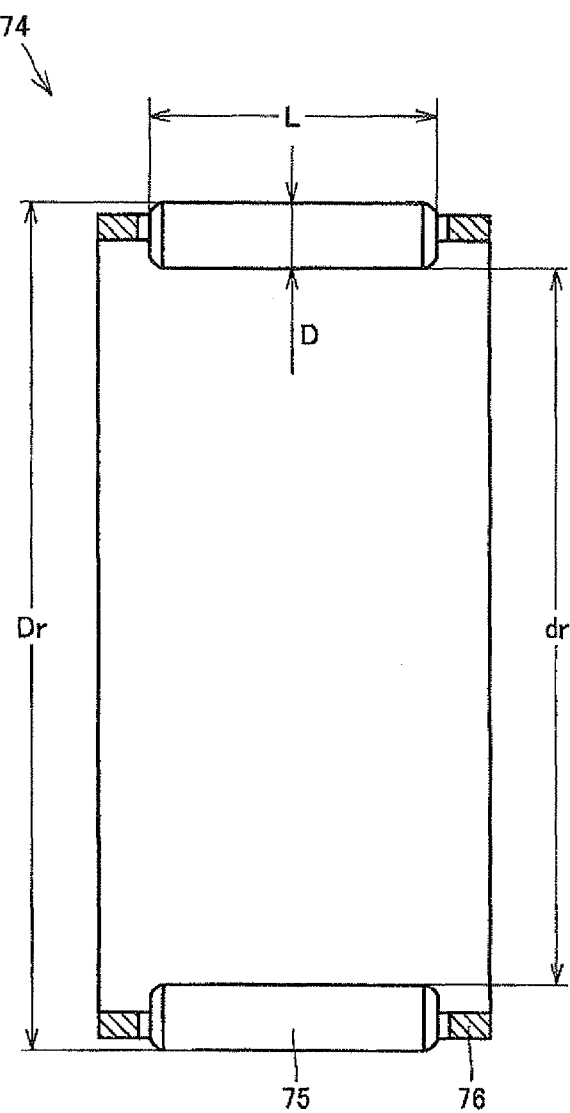
FIG. 21 is a view showing a needle roller bearing used in the effect confirming test.

As the bearing used in the above test, a needle roller bearing 74 as shown in FIG. 21 was used instead of the rocking bearing. The needle roller bearing 74 includes needle rollers 75, and a retainer 76 having pockets for housing the needle rollers. In addition, the needle roller bearing 74 has an outer diameter Dr of 66 mm and an inner diameter dr of 25 mm, and the needle roller 75 has a diameter D of 4 mm and a roller length L of 25.8 mm, and fifteen needle rollers 75 are housed.

Figure 22:
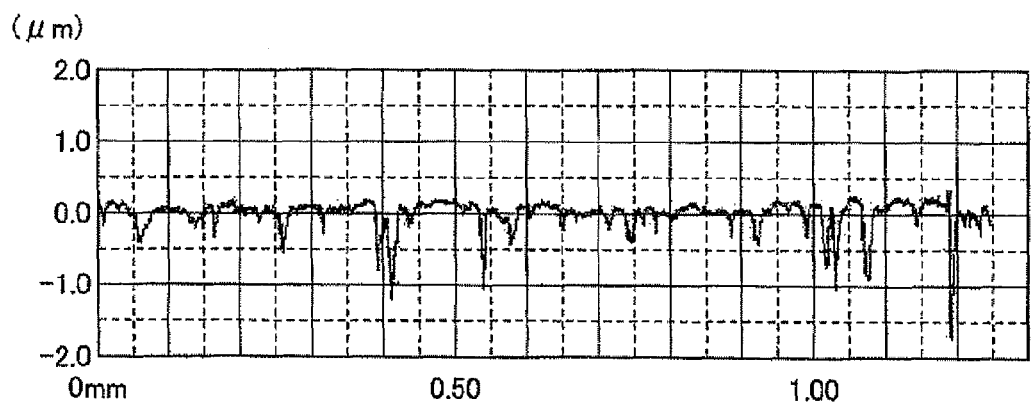
FIG. 22 is a view showing a component surface state after subjected to a surface process shown in Table 1.
Figure 23:
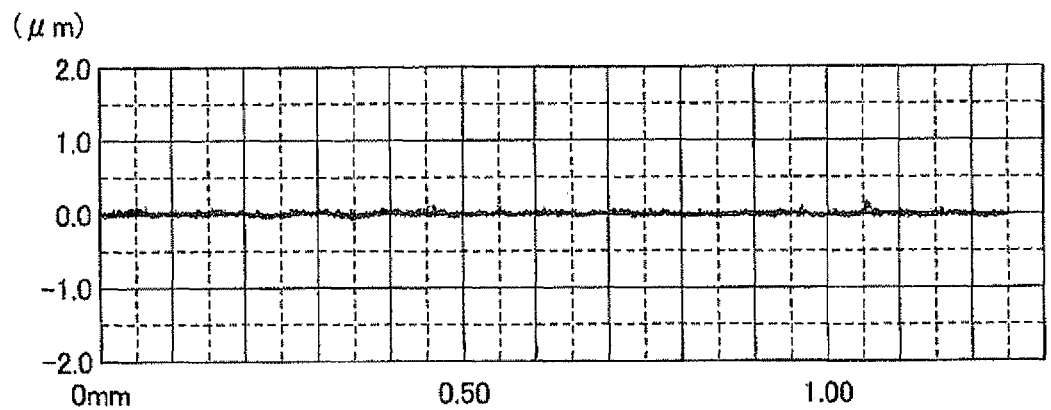
FIG. 23 is a view showing a surface state of a component that is not subjected to the surface process.

In addition, a needle roller bearing (inventive product) using needle rollers according to one embodiment of the present invention has been subjected to a surface treatment to obtain surface texture shown in an upper part in Table 1, and its surface state is as shown in FIG. 22. Meanwhile, a needle roller bearing (conventional product) using conventional needle rollers as a comparative object has not been subjected to a particular surface treatment and its surface texture is shown in a lower part in Table 1 and its surface state is as shown in FIG. 23.

TABLE 1

| Bearing | Rqni | Rsk | Area ratio (%) | Flaking life span |
|---|---|---|---|---|
| Inventive product | 0.10-0.30 | −5.0--1.6 | 10-40 | 1.7 |
| Conventional product | 0.01-0.03 | −0.8-0.9 | — | 1 |

Referring to Table 1, it has been confirmed that the flaking life span of the inventive product is 1.7 times longer than that of the conventional product.

Next, an air disc brake device 81 according to one embodiment of the present invention will be described with reference to FIGS. 24 and 25. In addition, FIG. 24 is a schematic cross-sectional view of the air disc brake device 81, and FIG. 25 is an enlarged cross-sectional view of a braking mechanism 90.

Figure 24:
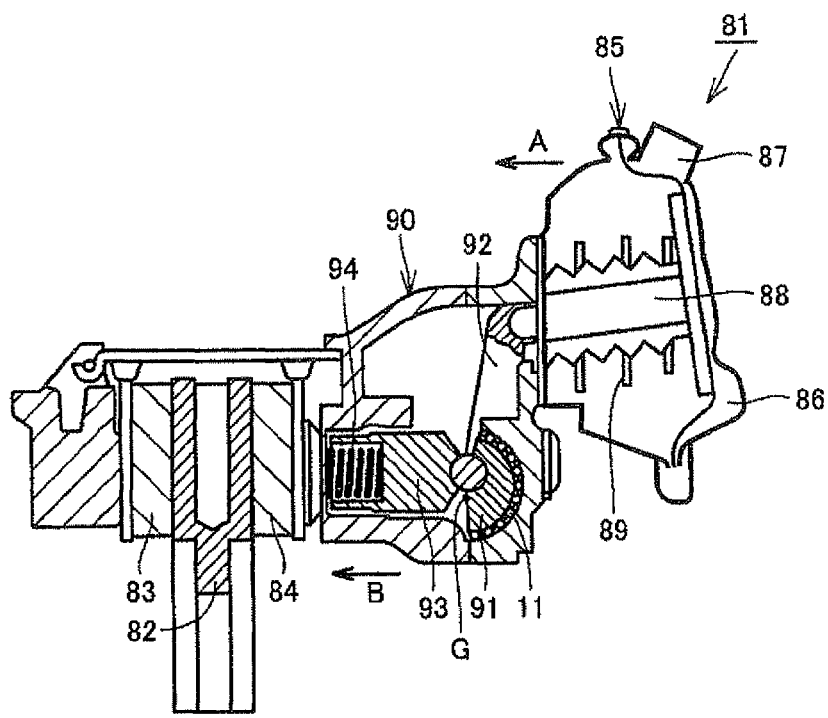
FIG. 24 is a view showing an air disc brake device according to one embodiment of the present invention.
Figure 25:
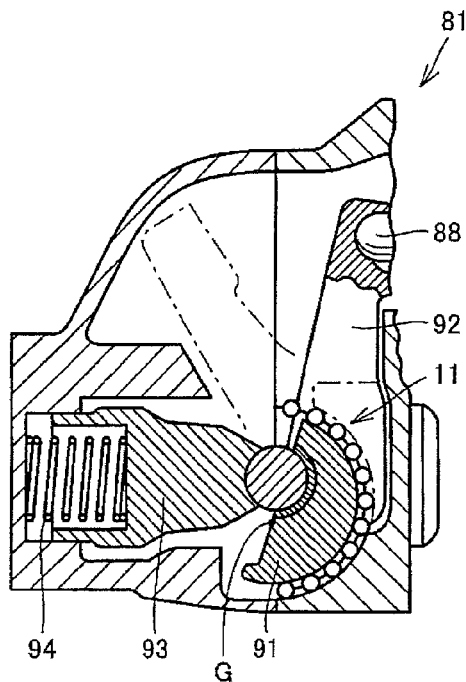
FIG. 25 is a partial enlarged view of FIG. 24.

First, referring to FIG. 24, the air disc brake device 81 mainly includes a brake disc 82 (called a rotor also) integrally rotating with a tire (not shown), a pair of brake pads 83 and 84, a brake cylinder 85, and the braking mechanism 90.

The pair of brake pads 83 and 84 is arranged so as to be axially adjacent to the brake disc 82. In addition, a predetermined gap is provided between the bake disc and the brake pads 83 and 84 during a non-braking state (in which a brake pedal is not depressed).

The brake cylinder 85 includes a capacity variable air chamber 86, a port 87 for supplying and discharging air to and from the air chamber 86, an actuator rod 88 moving in an axial direction ("a direction shown by an arrow A and its opposite direction in FIG. 24") as the capacity of the air chamber 86 varies, and a coil spring 89 serving as an elastic member which forces the actuator rod 88 in a direction to reduce the capacity of the air chamber 86.

The braking mechanism 90 has a rocking member 91 on its one side end portion, and a pivot lever 92 connected to the actuator rod 88 on the other side end portion and moving around a rocking center G of the rocking member 91, the rocking bearing 11 according to one embodiment of the present invention to swingably support the rocking member 91, a traverse 93 mounted on a position apart from the rocking center G of the rocking member 91 and moving in the axial direction ("a direction shown by an arrow B and its opposite direction in FIG. 24"), and a coil spring 94 serving as an elastic member which forces the traverse 93 in a direction departing from the brake pads 83 and 84.

The above-described air disc brake device 81 is employed in a large-sized vehicle such as a large-sized commercial car, a track, or a bus which requires great braking force.

A description will be made of an operation of the above-described air disc brake device 81. First, when the brake pedal (not shown) is depressed, air is supplied from the port 87 to the air chamber 86, and the capacity of the air chamber 86 is increased. As the capacity of the air chamber 86 is increased, the actuator rod 88 moves in the direction shown by the arrow A against the elastic force of the coil spring 89. The pivot lever 92 pushed by the actuator rod 88 moves around the rocking center G counterclockwise (the position of the pivot lever 92 after the movement is shown by a one dot chain line in FIG. 25). The traverse 93 mounted on the position apart from the rocking center G of the rocking member 91 moves in the direction shown by the arrow B against the elastic force of the coil spring 94. Thus, the brake pads 83 and 84 are pressed against the brake disc 82 and the rotation of a tire is braked.

Meanwhile, when the brake pedal is released, the air in the air chamber 86 is discharged from the port 87, and the capacity of the air chamber 86 is decreased. As the capacity of the air chamber 86 is decreased, the coil spring 89 moves the actuator rod 88 in a direction opposite to the arrow A. The pivot lever 92 connected to the actuator rod 88 moves around the rocking center G clockwise. Thus, the coil spring 94 moves the traverse 93 in a direction opposite to the arrow B. Thus, the predetermined gap is formed between the brake disc 82 and the brake pads 83 and 84, whereby the braking force of the tire is released.

When the above-described air disc brake device 81 employs the rocking bearing 11 according to one embodiment of the present invention as the bearing for swingably supporting the rocking member 91, the long-lived and highly-reliable air disc brake device 81 can be implemented. In addition, even when any one of the rocking bearings 21, 41, 51, and 61 is employed, the same effect can be provided.

Although the embodiments of the present invention have been described with reference to the drawings in the above, the present invention is not limited to the above-illustrated embodiments. Various kinds of modifications and variations may be added to the illustrated embodiments within the same or equal scope of the present invention.

INDUSTRIAL APPLICABILITY

The present invention can be advantageously applied to a rocking bearing.

What is claimed is:

1. A rocking bearing outer ring comprising:

an arcuate track member having a track surface on an inner diameter surface; and a flange portion projecting radially inward from each widthwise end portion of said track member, wherein the following relationship is satisfied $$0.2 \leq L_2/L_1 \leq 0.8$$

wherein $L_1$ represents a circumferential length of said track member and $L_2$ represents a circumferential length of said flange portion, wherein said flange portion includes a first flange portion, and a second flange portion having a projection length smaller than a projection length of the first flange portion, the second flange portion disposed so as to be circumferentially adjacent to said first flange portion.

2. The rocking bearing outer ring according to claim 1, wherein
said flange portion is positioned at a circumferential center region of said track member.

3. A rocking bearing comprising:
the rocking bearing outer ring according to claim 1;
a plurality of rollers disposed along said track surface; and
a retainer for retaining said plurality of rollers.

4. The rocking bearing according to claim 3, wherein
said flange portion further comprises a projection portion extending widthwise inward from a tip end of said flange portion to retain said retainer from a radially inner side of the flange portion.

5. The rocking bearing according to claim 3, wherein
said flange portion extends radially inward from each widthwise end portion of said track member so as to form an acute angle with said track surface,
said retainer is disposed in a region surrounded by said track surface and said flange portions, and
a distance between tip ends of said flange portions is shorter than a maximum width dimension of said retainer.

6. The rocking bearing according to claim 3, wherein
said flange portion is formed by a bending process.

7. The rocking bearing according to claim 3, wherein
said retainer has a continuing projection strip on its widthwise end surface.

8. The rocking bearing according to claim 3, wherein
said retainer is a resin retainer containing polyamide 46 and 5% to 20% by weight of fibrous filler material.

9. The rocking bearing according to claim 3, wherein
the following relationship is satisfied $$1 < r_1/r_2 < 1.15$$

wherein $r_1$ represents a curvature radius of an outer diameter of said rocking bearing outer ring, and $r_2$ represents a curvature radius of an outer diameter of said retainer.

10. The rocking bearing according to claim 3, wherein
each of said plurality of rollers has numerous fine dents formed in its surface at random.

11. The rocking bearing according to claim 10, wherein
an area ratio of said dents to a surface area of said roller is 10% to 40%.

12. The rocking bearing according to claim 10, wherein
a Sk value of the said roller surface is −1.6 or less.

13. An air disc brake device comprising the rocking bearing according to claim 3.

14. A fitting structure of a rocking bearing outer ring comprising:
a rocking bearing outer ring having an arcuate track member having a track surface on an inner diameter surface, and a flange portion projecting radially inward from each widthwise end portion of said track member; and
a housing for holding the rocking bearing outer ring, wherein
the following relationship is satisfied $$1 < r_1/r_3 < 1.15$$

wherein $r_1$ represents a curvature radius of an outer diameter of said rocking bearing outer ring, and $r_3$ represents a curvature radius of an inner diameter of said housing, wherein said flange portion includes a first flange portion, and a second flange portion having a projection length smaller than a projection length of the first flange portion, the second flange portion disposed so as to be circumferentially adjacent to said first flange portion.

* * * * *